United States Patent [19]

Bakanovich et al.

[11] 4,205,383
[45] May 27, 1980

[54] METHOD OF TESTING OBJECTS FOR RANDOM ACTIONS THEREON AND DIGITAL SIMULATOR-COMPUTER SYSTEM FOR EFFECTING SAME

[76] Inventors: Eduard A. Bakanovich, ulitsa Chicherina, 4, kv. 19; Mikhail A. Orlov, prospekt Pushkina, 23, kv. 14; Sergei F. Kostjuk, ulitsa Mayakovskogo, 26, kv. 19; Vladimir P. Shmerko, ulitsa Tikhotskogo, 26, kv. 102, all of Minsk; Igor E. Gagen, Moskovsky prospekt, 189, kv. 60, Leningrad; Aron G. Gringlaz, Prazhskaya ulitsa, 27, kv. 17, Leningrad; Valery M. Kulakov, prospekt Slavy, 37, kv. 261, Leningrad; Valery B. Lysov, ulitsa Sevastianova, 4, kv. 41, Leningrad; Alexandr V. Menkov, Slobodskoi pereulok, 6-a, kv. 58, Moscow; Nikolai I. Pikin, ulitsa Goletiana, 26, kv. 24, Leningrad; Vladimir N. Chetverikov, ulitsa Malaya Bronnaya, 31/13, kv. 48, Moscow; Nikolai I. Melnik, ulitsa Lomonosova, 4, kv. 27, Minsk; Vladimir I. Novikov, ulitsa Karbysheva, 9, kv. 150, Minsk; Alexandr N. Popov, Partizansky prospekt, 105, kv. 24, Minsk; Evgeny A. Yakushenko, ulitsa Leni Golikova, 94, kv. 58, Leningrad, all of U.S.S.R.

[21] Appl. No.: 959,422

[22] Filed: Nov. 13, 1978

[51] Int. Cl.$^2$ .............................................. G06F 15/36
[52] U.S. Cl. ................................................. 364/554
[58] Field of Search ........ 364/550, 554, 701, 551–553, 364/578, 107

[56] References Cited

U.S. PATENT DOCUMENTS

| 3,626,168 | 12/1971 | Norsworthy | 364/554 X |
| 3,732,405 | 5/1973 | Stewart | 364/554 X |
| 3,833,797 | 9/1974 | Grobman et al. | 364/554 X |
| 4,115,867 | 9/1978 | Vladimirov et al. | 364/554 X |

Primary Examiner—Edward J. Wise
Attorney, Agent, or Firm—Lackenbach, Lilling & Siegel

[57] ABSTRACT

The proposed method of testing objects for random actions thereon consists of recording random actions to which an object is subjected in the course of operation, determining the characteristics of said random actions, reproducing said random actions as a stimulating random pulse process which is a train of pulses of different shapes of a selected combination of pulse shapes, forming statistically independent random parameters of pulses, analyzing the characteristics of the random actions being reproduced and the response of the object to these random actions, and correcting the characteristics of the simulating random pulse process by varying its probability characteristics. The proposed digital simulator-computer system comprises a control computer hooked via an interface unit to main and auxiliary forward and feedback channels, and a test bed connected via first and second distribution devices, respectively, to the main and auxiliary forward channels and the main and auxiliary feedback channels.

39 Claims, 10 Drawing Figures

METHOD OF TESTING OBJECTS FOR RANDOM ACTIONS THEREON AND DIGITAL SIMULATOR-COMPUTER SYSTEM FOR EFFECTING SAME

FIELD OF THE INVENTION

The present invention relates to control computers and more particularly to methods of testing different objects for random actions upon these objects, as well as digital simulator-computer systems for effecting such methods, which systems comprise digital controlled simulators of random actions, operating in conjunction with digital computers.

The proposed method of testing objects for random actions thereon and digital simulator computer system for effecting said method are applicable to:

tests for random and deterministic mechanical shock processes;

tests for the effects of random actions such as jolts during transportation;

tests for the effects of narrow- and wide-band vibration;

tests for the effects of random continuous and pulsed electric processes with predetermined controlled statistical characteristics; and investigation of complex objects of different types through the use of statistical modelling.

The basic problem involved in testing objects for random actions thereon and in providing digital simulator-computer systems for effecting such methods is how to increase the effectiveness of testing and improve the utilization factor of the control and testing equipment.

The present invention provides a partial solution to this problem.

DESCRIPTION OF THE PRIOR ART

There is known a number of methods for testing objects for the effects of random actions. Some of these are dealt with in the following works:

W.E. Schilke, Analysis of Transmission and Vehicle Field Test Data, SAE Preprints, s.a., No. 9379, 14 pp. ill;

Allen D. Diercks, A Portable Shock and Environmental Recording System, "Inst. Environm. Sci. Annual techn. Meet. Proc., San Diego, Calif., 1966", Mt. Prospect, Ill., 1966, pp. 389-394;

Charles W. Elliot Jr, Environmental Testing Techniques Mach. Design, 1967, 39, No 27, pp. 176-181;

T.R. Mann, W.M. Myers, A Digital System for Controlled Vibration Test, "J. Sci. Environ. Eng.", 1973, 12, No. 3, pp. 8-16; and Paul Leguay, Maurice Magne, Procédé de réalisation de chocs sur excitateur électrodynamique et dispositif pour la mise en oeuvre du procede. (Commissariat à l'Energie Atomique, France). French Pat. No. 2,175,257, G01 m 7/00, G06 g 7/00, 1973.

There is also known a method for producing a shock action within a desired spectrum of frequencies upon an object, which method presupposes automatic or semiautomatic analysis of the effects of such an action. According to the method in question, a single signal or part of a process are reproduced by deterministically adding together harmonic oscillations with set amplitudes, phases and frequencies and applying them to the object being tested (cf. Philip Marshall, William C. Stevens Jr, Shock Spectrum Analysis Method and Apparatus /Marshall Research and Development Corporation/, U.S. Pat. No. 9,842,661, 73-67.1, G01 h 1/00, 1974). This method has certain limitations as regards the reproduction of random actions.

There is also known a method (cf. John D. Favour, Joy M. Le Brum, Joseph P. Young, Transient Waveform Control of Electromagnetic Test Equipment, "J. Environ. Sci.", 1970, 13, No. 4, pp. 7-13) which comprises:

recording random actions to which an object is subjected in the course of operation;

determining the spectral composition and statistical characteristics of the recorded random actions;

calculating the spectral characteristics of a simulating process applied to the test equipment with due regard for the transfer characteristic of said test equipment;

calculating the time function which determines one version of the simulating process with a desired spectral characteristic;

recording the calculated time function as a sequence of codes corresponding to instantaneous values of the simulating process; and applying the sequence of codes thus produced to the test equipment via a code-to-analog converter.

Although making it possible to reproduce large numbers of different types of test actions, the method under review does not provide for full utilization of the potentialities of digital simulator-computer systems intended for its realization.

This is partly due to the deterministic, and not random, nature of actions being reproduced, keeping in mind that any realization of a random action, stored, for example, in a computer's memory, ceases to be a random time function, but is unambiguously determined by the Fourier spectrum found by using the known techniques.

For that reason, the testing conditions in a number of cases are not sufficiently adequate for the actual operating conditions.

When using a conventional system, a better correspondence between the testing and operating conditions can be achieved by accumulating in advance a considerable amount of recordings of random actions in actual operating conditions; however, this makes testing of objects under operating conditions a prolonged and labor-consuming process Another limitation of the above method is the impossibility of performing a test during a period of time of any desired duration. If a test takes longer than the duration of the time interval corresponding to the calculated time function stored in the computer, a continuation of the test requires a repetition of the same non-random realization. However, a change in the statistical characteristics of the realization being repeated may change the preset Fourier spectrum and thus make it more difficult to control the parameters of the action being reproduced.

There is also known a method described in the article by I. E. Gagen, A. G. Gringlaz, M. I. Kiselyova and V. B. Lysov, "Vosproizvedenie v laboratornykh usloviyakh sluchainykh udarnykh nagruzok, vozdeistvuyushchikh na radioelectronnuyu apparaturu i eyo elementy v usloviyakh eksluatatsii " /"Laboratory Reproduction of Random Shock Loads Acting Upon Electronic Equipment and Its Components in Operating Conditions"/ /in Russian/, published in the journal "Electronnaya technika" /"Electronic Engineering"/, Series 8, No. 10 (28), 1974. This method comprises the following sequence of operations:

recording random actions which an object is subjected in the course of operation;

determining the spectral and statistical characteristics of the recorded random actions; and reproducing the random actions as a simulating random pulse process, wherein the amplitudes, durations and polarities of pulses, as well as intervals between pulses, are random parameters adequate for the recorded random actions as regards their spectral and statistical characteristics, whereupon the reproduced random actions are applied to the object being tested.

Specific parameter values of each pulse are determined by successively selecting, without replacement, one card of a set of cards, whereon the values of the respective pulse parameters are indicated.

According to the method under review, pulse parameters of a single realization of the simulating random pulse process are determined as follows. First, there are prepared three sets of cards, each containing an equal number of cards. The cards of the first set contain pulse amplitudes. The cards of the second set contain pulse durations. The cards of the third set contain the values of intervals between pulses. Parameters of a single pulse are determined by selecting one card from each set of cards. The selected cards are not returned to the sets.

The method under review makes it possible to perform tests for the effects of random actions with a limited number of controlled pulse parameters of the simulating random pulse process. However, pulse parameters, formed in accordance with the method, are statistically dependent. This factor, as well as the use of pulses of a strictly set shape, account for a limited class of reproduced spectral and statistical characteristics; in addition, the above limitations make it difficult to control the parameters of the simulating random pulse process, especially while adjusting the characteristics of random actions upon an object being tested.

There are known simulator-computer systems for testing objects for random actions thereon.

One of the known systems (cf. Walter Schütz, Peiner Weber, Steuerung von Schingprütmaschinen durch Prozessrechner "Materialprütung", 1970, 12, No 11, pp. 369–372) comprises a control computer intended to form deterministic test signals and control the units of the systems. The system further includes an interface to conjugate the control computer with the system's units. The interface's first and second outputs are connected to the control computer. The system also includes a forward channel, comprising at least one digital-analog converter, and a feedback channel. The feedback channel is connected to the second output of the interface and includes at least one analog-to-digital converter. A second input of the interface is connected to test equipment intended to transmit test actions to an object being tested and electrically coupled to the forward and feedback channels. Finally, the system contains an electronic clock, printing devices and control panels connected to respective inputs and outputs of the interface.

All the test signals are produced by the control computer according to special programs which presuppose simulation of both deterministics and pseudorandom actions.

At the output of the control computer, the test signals are represented in digital form. The forward channel then converts these signals to analog signals to be applied to the testing equipment. With the aid of power amplifiers and other transfer units incorporated in the testing equipment, the simulated actions are transmitted to the object being tested. Upon measuring the parameters of the object's states, respective signals and signals carrying information on certain parameters of the reproduced action are transmitted through the feedback channel and interface to the control computer; as this takes place, analog signals carrying information on the measured parameters are converted by the feedback channel to digital signals.

As do other similar systems, the system under review possesses a broad range of functional potentialities and can perform tests for complex actions. That notwithstanding, the system does not make full use of all the possibilities of increasing the effectiveness of the tests. This is due to the considerable difficulties involved in testing some objects for random loads, because to simulate such loads, the system uses pseudorandom signal generators which produce deterministic time functions corresponding to a single recorded realization of a random action. Besides, the utilization factor of the control computer is not high enough, because much time is spent to form pseudorandom numbers possessing the desired statistical characteristics.

BRIEF DESCRIPTION OF THE INVENTION

It is an object of the present invention to provide a method and simulator-computer system for testing objects for random actions, which would make it possible to increase the effectiveness of tests of any duration and improve the utilization factor of the control and testing equipment.

It is another object of the invention to provide a method and simulator-computer system for testing objects for random actions, which would make it possible to speed up and facilitate the testing of objects under operating conditions.

It is still another object of the invention to provide a method and simulator-computer system for testing objects for random actions, which would make it possible to simplify the control of parameters of reproduced actions.

It is yet another object of the invention to provide a method and simulator-computer system for testing objects for random actions, which would make the testing conditions more compatible with the operating conditions.

The foregoing objects of the present invention are attained by providing a method for testing objects for random actions, consisting of:

recording random actions to which an object is subjected in the course of operation;

determining the spectral composition and statistical characteristics of the recorded random actions upon the object;

reproducing the random actions in the form of a simulating random pulse process with amplitudes, durations and polarities of pulses, and with intervals between pulses being random parameters adequate for the recorded random actions as regards their spectral and statistical characteristics;

applying the reproduced random actions to the object being tested, whereby, in accordance with the invention, a totality of pulse forms is selected and the simulating random pulse process is formed as a train of pulses of different shapes selected from a predetermined combination of pulse shapes;

forming statistically independent random parameters of pulses;

analyzing the spectral and statistical characteristics of the reproduced random actions and the response to these actions of the object being tested; and correcting the characteristics of the simulating random pulse process by varying its probability characteristics.

It is preferable that pulses of the simulating random pulse process should be modulated by a harmonic signal possessing a statistically independent random amplitude, phase and frequency.

It is also expedient that pulses of the simulating random pulse process should be modulated by a converted combination of harmonic signals possessing statistically independent random amplitudes, phases and frequencies.

It is preferable that a digital simulator-computer system for effecting the foregoing method should comprise:

a control computer intended to produce deterministic test signals and to control units of the system;

an interface unit intended to conjugate said control computer with the system's units, one input and one output of which are connected to said control computer;

a main forward channel comprising at least one digital-to-analog converter and connected to another output of the interface unit;

a main feedback channel comprising at least one analog-to-digital converter and connected to another input of the interface unit;

a test bed intended to transmit test actions to the object being tested and electrically coupled to the forward and feedback channels;

an auxiliary forward channel comprising at least one digital controlled simulator of random actions, intended to reproduce random actions upon the object as a simulating random pulse process and connected to the interface unit; and an auxiliary feedback channel comprising at least one digital multifunctional statistical analyzer intended to statistically analyze the reproduced random actions during the course of testing objects and connected to an input of the interface unit, the test bed being electrically coupled to the main and auxiliary forward channels and the main and auxiliary feedback channels through respective distribution devices.

It is highly desirable that the output of the auxiliary feedback channel should be connected to a respective input of the auxiliary forward channel.

According to the invention, the digital controlled simulator of random actions may include:

a memory intended for storing codes determining the type and numerical characteristics of distribution functions of random parameters of pulses of the simulating random pulse process, respective inputs being connected to the output of the interface unit and the output of the additional feedback channel.

A random numbers transducer is intended to form codes of random numbers corresponding to specific amplitude, duration and polarity values of pulses, and durations of intervals between pulses. It has an input and an output respectively connected to an output and an input of the memory.

A control unit is intended to synchronize operation of all the units of the digital controlled random actions simulator and to ensure an exchange of information between the units of said digital controlled random actions simulator. Inputs and outputs of said control unit are connected to respective outputs and respective inputs of said memory and of said random numbers transducer.

A pulse counter stores a random code determining the duration of a time interval between pulse signals of the simulating random pulse process and converts that code to a time interval. An input of said pulse counter is connected to a respective output of said random numbers transducer. An input and an output are respectively connected to an output and an input of the control unit.

A generator of variable recurrence frequency pulses is intended to produce a flow of clock pulses to fill the pulse counter and to set the frequency of the output pulse signal flow of the digital controlled random actions simulator. A reference voltage source is intended to set an amplitude distribution range of pulse signals formed by the digital controlled random actions simulator. The reference voltage source is electrically coupled to a number-to-voltage converter intended to convert the code determining the amplitude of pulse signals to a voltage corresponding to that amplitude and distributed within the amplitude distribution range.

A second number-to-voltage converter intended for voltage conversion of codes whose sequence determines the shape of pulse signals formed by the digital controlled random actions simulator. The number-to-voltage converters are interconnected.

A polarity modulator intended to ensure a prescribed probability of producing positive and negative pulses. It has an input connected to a respective output of the reference voltage source, and an output connected to an input of the first distribution device. The number-to-voltage converters and the polarity modulator are placed in series.

A register is intended for storing a code determining the amplitude and polarity of the next pulse of the simulating random pulse process. It has outputs connected to the input of the first number-to-voltage converter and to the input of the polarity modulator. Its inputs are connected to outputs of the random numbers transducer and of the control unit.

A reversible counter is intended to form a linearly rising and dropping code sequence, whereby an isosceles triangle-shaped pulse is produced. The output of said reversible counter is electrically coupled to the input of the second number-to-voltage converter. Another output is connected to a respective input of the control unit. An input of said reversible counter is connected to a respective output of the control unit.

A second pulse generator is intended to form a flow of clock pulses whose frequency is equal to the maximum frequency at which said reversible counter is filled.

A frequency divider is intended to set the rate at which the reversible counter is filled with clock pulses. This frequency divider is interposed between the second pulse generator and an input of the reversible counter.

A second register is intended to store a code corresponding to the duration of the base of the isosceles triangle-shaped pulse and determining the repetition frequency of clock pulses filling said reversible counter. The output of said second register is connected to an input of the frequency divider. Its inputs are connected to outputs of the random numbers transducer and of the control unit.

According to the invention, the digital controlled simulator of random actions may also include: a cyclic shift register intended for storing a code determining the sequence of changing the polarity sign of a group of pulses at the output of the digital controlled random actions simulator.

A cycle length control unit sets the number of pulses in a group of successive pulses at the output of the digital controlled random actions simulator. An input and output of said cycle length control unit are connected to a respective output and a respective input of the reversible counter. Outputs of said cycle length control unit are connected to respective inputs of the cyclic shift register. The digital controlled random actions simulator also includes a flip-flop, two conjunctors and a disjunctor, intended to ensure separate transmission of codes from the output of the cyclic shift register to the polarity modulator. The outpuf of the disjunctor is connected to an input of the polarity modulator. The output of each of the conjunctors is connected to a respective input of the disjunctor. First inputs of the conjunctors are connected to the output of the flip-flop. One of the conjunctors has a second input connected to the output of the cyclic shift register. The reversible counter is electrically coupled to the second number-to-voltage converter via a second memory intended for storing codes of ordinates of a pulse of a prescribed shape. The digital controlled random actions simulator also includes a second flip-flop, two conjunctor units and a disjunctor unit, intended to ensure separate transmission of codes from the outputs of the reversible counter and the second memory to the input of the second number-to-voltage converter. The output of the disjunctor unit is connected to the second input of the second number-to-voltage converter. The output of each of the conjunctor units is connected to a respective input of the disjunctor unit. Their first inputs are connected to the output of the second flip-flop. A second input of one of said conjunctor units is connected to the output of the reversible counter and a second input of the second conjunctor unit is connected to the output of the second memory. Another output of the second memory is connected to the second input of the first conjunctor of the first set of conjunctors to ensure separate transmission of codes from said memory to said polarity modulator.

According to the invention, the digital controlled random actions simulator may also include:

a second reversible counter intended to form a linearly changing code sequence. Its inputs are respectively connected to the output of the random numbers transducer and the output of the control unit. The output of said second reversible counter is connected to a respective input of the polarity modulator.

A digital functional converter converts the linearly changing input code sequence to a non-linear code sequence determining the shape of a signal modulating the envelope of the pulse signal formed by the digital controlled random actions simulator. The input of said digital functional converter is connected to a respective output of the second reversible counter.

A third register sets the amplitude of the modulating signal. Its inputs are connected to the output of the random numbers transducer and the output of the control unit, respectively.

Third and fourth number-to-voltage converters have an input connected to the output of the third register and the output of the digital functional converter, respectively. The number-to-voltage converters are placed in series and interposed between the output of the reference voltage source and the input of the first number-to-voltage converter.

A third pulse generator intended generates clock pulses whose frequency is equal to a maximum frequency at which the second reversible counter is filled.

A secnd frequency divider sets a frequency at which the second reversible counter is filled with clock pulses. This second frequency divider is interposed between the respective pulse generator and the input of the second reversible counter.

A fourth register stores a code determining the frequency at which the second reversible counter is filled with clock pulses. Inputs of said fourth register are connected to a respective output of the random numbers transducer and a respective output of the control unit. The output of said fourth register is connected to the input of the second frequency divider.

It is preferable that the digital controlled random actions simulator should include:

harmonic oscillators intended to set a desired Fourier spectrum of pulses of the simulating random pulse process. The outputs of the oscillators are combined.

Initial conditions registers store predetermined initial phases of harmonic oscillations. Their outputs are connected to inputs of a respective harmonic oscillator.

A first distributor setting frequencies of harmonic oscillations at the outputs of the harmonic oscillators. Its groups of outputs are respectively connected to inputs of the respective harmonic oscillators. A single output is connected to a respective input of lack of the harmonic oscillators.

A second distributor enters in the initial conditions registers the codes determining the initial phases of harmonic oscillations. Its group of outputs is connected to inputs of the respective initial conditions registers. Other outputs are connected to inputs of the harmonic oscillators and the input of the first distributor.

A result accumulator is intended for non-linear conversion of harmonic oscillations. It has an input connected to the outputs of the harmonic oscillators.

A synchronization unit has a group of inputs connected to a respective group of outputs of the result accumulator an input connected to an output of the first distributor, and outputs connected to the input of the first distributor and respective inputs of the result accumulator.

A pulse generator forms a first train of clock pulses from a reference train of pulses, the frequency of said first train of clock pulses determining the duration of a pulse at the output of the digital controlled random actions simulator.

A first frequency divider forms a first train of clock pulses from a reference train of pulses.

A second frequency divider forms a second train of clock pulses from the reference train of pulses, which second train of clock pulses determines the area of random values of time intervals between the leading edges of adjacent pulses at the output of the digital controlled random actions simulator. The output of one of the frequency dividers is connected to a respective input of the result accumulator and an input of the first distributor. The output of the pulse generator is connected to other inputs of the two frequency dividers and an input of the synchronization unit.

A frequency division factor codes register has an output connected to one input of each of the two frequency dividers.

A first memory intended stores codes determining the distribution pattern of the random value of the time interval between the leading edges of adjacent pulse at the output of the digital controlled random actions simulator.

A random numbers transducer produces random codes with a predetermined distribution function. An output and an input of the first memory are connected to a respective input and a respective output of the random numbers transducer. Outputs of the random numbers transducer are connected to inputs of respective initial conditions registers.

A first pulse counter intended to convert the random code to a time interval. Another input of said random numbers transducer and an input of the first pulse counter are combined and connected to an output of the second distributor.

An input of the first pulse counter is connected to the output of the second frequency divider. The output of the first pulse counter is connected to the input of the second distributor.

A decoder is intended to additionally enter codes in the initial conditions registers. Outputs are connected to the inputs of respective initial conditions registers.

A second memory stores codes determining the spectral power density of the random pulse process at the output of the digital controlled random actions simulator. An input of the second memory is connected to a respective output of the first distributor and an output is connected to the input of the result accumulator.

A second pulse counter sets cell addresses of the memories for entering information in said cells. The output of the second pulse counter is connected to an input of the first memory, an input of the second memory and an input of the decoder.

A commutator enters codes in the memories through two independent channels. Its inputs are respectively connected to the output of the interface unit and the output of the auxiliary feedback channel. Its outputs are connected to the input of the second pulse counter, an input of the frequency division factor codes register, an input of the first memory, an input of the second memory, an input of the second distributor and inputs of the initial conditions registers.

A number-to-voltage converter is intended for analog representation of the simulating random pulse process. Its output is connected to the input of the distribution device of the forward channel.

An actual process value code register has an output connected to the input of the number-to-voltage converter. Its inputs are connected to an output of the result accumulator, an output of the second distributor, a respective output of the first distributor, and an input of the second distributor.

It is further preferable that each harmonic oscillator of the digital controlled random actions simulator should include: a conjunctor intended to control the harmonic oscillator through two inputs;

a reversible counter intended to form a linearly changing code sequence;

a code converter intended to convert the linearly changing code sequence to a sinusoidally changing sequence; and a multiplexer intended to combine the outputs of the harmonic oscillators. The inputs of the conjunctor are connected to the outputs of the first distributor, the output of the conjunctor is connected to an input of the reversible counter, other inputs of the reversible counter are respectively connected to the initial conditions registers and the second distributor, the output of the reversible counter is connected to the input of the code converter, the output of the code convertor is connected to the input of the multiplexer, another input of the multiplier is connected to the output of the first distributor, and the output of the multiplexer is connected to the input of the result accumulator.

It is preferable that the first distributor of the digital controlled random actions simulator should include:

a shift register intended to produce a system of potentials to control the frequencies of the harmonic oscillators;

a flip-flop, three conjunctors and a disjunctor, an input of the shift register being combined with an input of the first conjunctor, an output of the shift register being connected to the inputs of the harmonic oscillators and an input of the first conjunctor, the outputs of the first and second conjunctors being respectively connected to inputs of the disjunctor, the output of the first conjunctor being connected to an output of said first distributor, the output of the disjunctor being connected to the input of the flip-flop, inputs of the third conjunctor being connected to the output of the flip-flop and the output of the synchronization unit;

a pulse counter intended to form a code setting the number of a harmonic oscillator, its first input being connected to the combined inputs of the shift register and the first conjunctor, as well as to the output of the third conjunctor connected to the inputs of the harmonic oscillators, of the second conjunctor being connected to the output of the result accumulator, the output of the second distributor, an input of the shift register, the output of the flip-flop and the input of the pulse counter; and a decoder intended to produce signals to control the multiplexer, its input being connected to the output of the pulse counter and the input of the second memory, the outputs of said decoder being connected to the inputs of the harmonic oscillator.

It is preferable that the second distributor of the digital controlled random actions simulator should include:

a pulse counter;

a first conjunctor and a decoder intended to form signals for entering information in the initial conditions registers, inputs of the decoder being connected to the output of the first conjunctor and the output of the pulse counter, outputs of said decoder being connected to the inputs of respective initial conditions register;

a register intended for storing a code determining the duration of a pulse of the random pulse process at the output of the digital controlled random actions simulator;

a comparison circuit intended to set an instant of time corresponding to the trailing edge of the pulse of the random pulse process at the output of the digital controlled random actions simulator, inputs of the comparison circuit being connected to the output of the register and the output of the pulse counter;

a first flip-flop whose output is connected to a respective input of the first conjunctor, a first input of the flip-flop and one input of the register being combined and connected to the output of the commutator, another input of the register being connected to the output of the decoder of the digital controlled random actions simulator;

a second flip-flop, second and third conjunctors and a disjunctor, inputs of the second conjunctor being connected to the output of the pulse counter of the digital controlled random actions simulator and the output of the second flip-flop, the output of said second conjunctor being connected to the input of the disjunctor and the inputs of the harmonic oscillators, the inputs of the third conjunctor being connected to the output of the comparison circuit, the input of the first conjunctor, the input of the pulse counter and the output of the first distributor, the output of said third conjunctor being connected to the input of the actual process value code register and the input of the disjunctor, the output of the disjunctor being connected to the input of the second flip-flop, the output of the second flip-flop being connected to a respective input of the first conjunctor, an input of the pulse counter and the input of the first distributor.

It is preferable that the result accumulator of the digital controlled random actions simulator should include the following devices.

A first register stores codes of actual amplitude values of harmonic oscillations. The inputs of the first register are connected to the outputs of the harmonic oscillators and the output of the synchronization unit.

An arithmetic logical unit is intended for non-linear conversion of codes of the harmonic oscillators. The output of the first register is connected to the input of the arithmetic logical unit.

A second register stores intermediate inputs of the second register, whose two other inputs are connected to the output of the synchronization unit and the output of the first frequency divider. The output of the second register is connected to another input of the arithmetic logical unit and the input of the actual process value code register.

A first flip-flop is intended for storing the polarity sign code of the harmonic oscillation.

A second flip-flop is intended for storing the sign code of the factor by which the amplitude of the harmonic oscillation is multiplied. The inputs of the first flip-flop are connected to respective inputs of the first register, a respective input of the second flip-flop and the output of the synchronization unit.

A modulo two adding circuit forms an attribute of an operation performed by the arithmetic logical unit. The inputs of the modulo two adding circuit are respectively connected to the outputs of the two flip-flops. The output of said modulo two adding circuit is connected to an input of the arithmetic logical unit.

A third register stores the code of a factor by which the harmonic oscillation amplitude is multiplied. Its inputs are connected to the inputs of the second flip-flop and the output of the second memory. Its outputs are connected to respective inputs of the synchronization unit.

It is also preferable that the synchronization unit of the digital controlled simulator of random actions should include:

Two flip-flops and two conjunctors intended to form two non-overlapping pulse trains.

A first disjunctor has an output connected to the input of the first flip-flop. This flip-flop has outputs connected to the input of the second flip-flop and a respective input of the first disjunctor. The outputs of the second flip-flop are connected to first inputs of the first and second conjunctors. The other inputs of these conjunctors are combined and connected to another input of the second flip-flop. The output of the first conjunctor is connected to the input of the result accumulator. The output of the second conjunctor is connected to the input of the first disjunctor and the input of the result accumulator.

A shift register forms a sequence of control potentials.

A third conjunctor and a second disjunctor form signals to control operation of the result accumulator. The output of this conjunctor is connected to the input of the first distributor and its input is connected to one of the inputs of a shift register. This shift register has another input connected to the output of the first flip-flop. The outputs of the shift register are respectively connected to the inputs of the second disjunctor, the input of the third conjunctor and the input of the first disjunctor. Other inputs of the second disjunctor are connected to the outputs of the result accumulator. Its output is connected to the input of the first conjunctor.

The output of a fourth conjunctor is connected to the input of the second flip-flop. One input of said fourth conjunctor is connected to the input of the second flip-flop. An input of a third flip-flop and an input of a fifth conjunctor are connected to the output of the first flip-flop. The output of the fifth conjunctor is connected to a respective input of the first disjunctor. An input of a sixth conjunctor and the input of the fourth conjunctor are connected to the output of the pulse generator. An input of a seventh conjunctor, the input of the third flip-flop and the input of the fifth conjunctor are connected to the output of the sixth conjunctor. Another input of the seventh conjunctor is connected to the output of the third flip-flop, whose other output is connected to the input of the fifth conjunctor. An input of the sixth conjunctor are and a respective input of the seventh conjunctor are connected to the output of the first flip-flop. The output of the seventh conjunctor is connected to the input of the result accumulator.

The present invention makes it possible to simplify the control and test equipment; it speeds up and facilitates tests of objects, carried out in actual operating conditions; it provides for simpler control of the characteristics of reproduced random actions; and, finally, it makes it possible to automate testing procedures and make the testing conditions more compatible with the actual operating conditions of objects being tested.

BRIEF DESCRIPTION OF THE DRAWINGS

Other objects and advantages of the present invention will become more apparent from the following detailed description of a preferred embodiment thereof to be read in conjunction with the accompanying drawings, wherein.

DETAILED DESCRIPTION OF THE INVENTION

Figure 1:
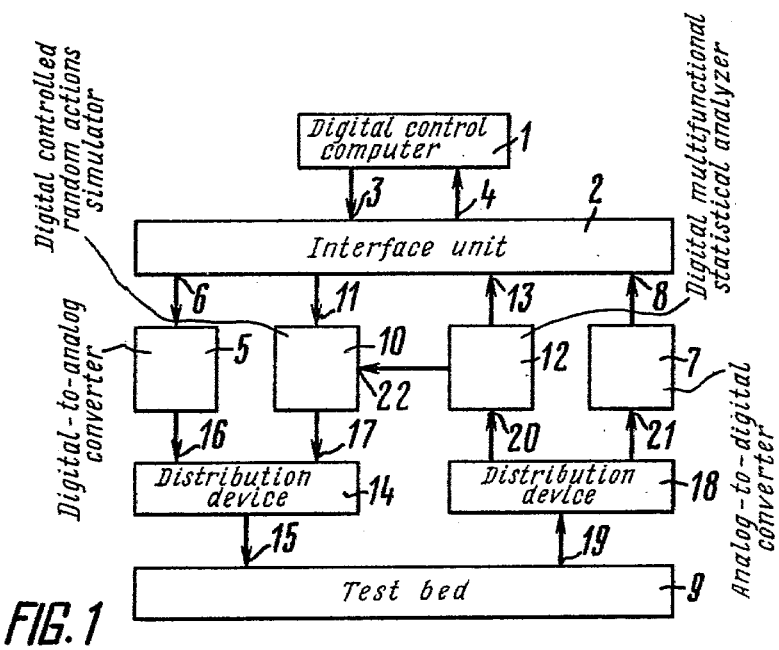
FIG. 1 is a block diagram of a device for testing objects for random actions, in accordance with the invention.

The proposed simulator-computer system comprises a control computer 1 (FIG. 1) and an interface unit 2 whose input 3 and output 4 are connected to the control computer 1. The system further includes a forward channel comprising at least one digital-to-analog converter 5 connected to a second output 6 of the interface unit 2, and a feedback channel comprising at least one analog-to-digital converter 7 connected to a second input 8 of the interface unit 2.

The system still further includes a test bed 9; an auxiliary forward channel comprising at least one digital controlled simulator 10 of random actions, whose input 11 is connected to a third output of the interface unit 2; and an auxiliary feedback channel comprising at least one digital multifunctional statistical analyzer 12 connected to a third input 13 of the interface unit 2.

The system also includes a distribution device 14 whose output is connected to an input 15 of the test bed 9. Inputs 16 and 17 of said distribution device 14 are connected to outputs of the digital-to-analog converter 5 and the digital controlled random actions simulator 10, respectively. The system also includes a second distribution device 18 whose input 19 is connected to an output of the test bed 9. Its outputs are connected to an input 20 of the digital multifunctional statistical analyzer 12 and an input 21 of the analog-to-digital converter 7, respectively. An input 22 of the digital controlled random actions simulator 10 is connected to another output of the digital multifunctional statistical analyzer 12.

Figure 2:
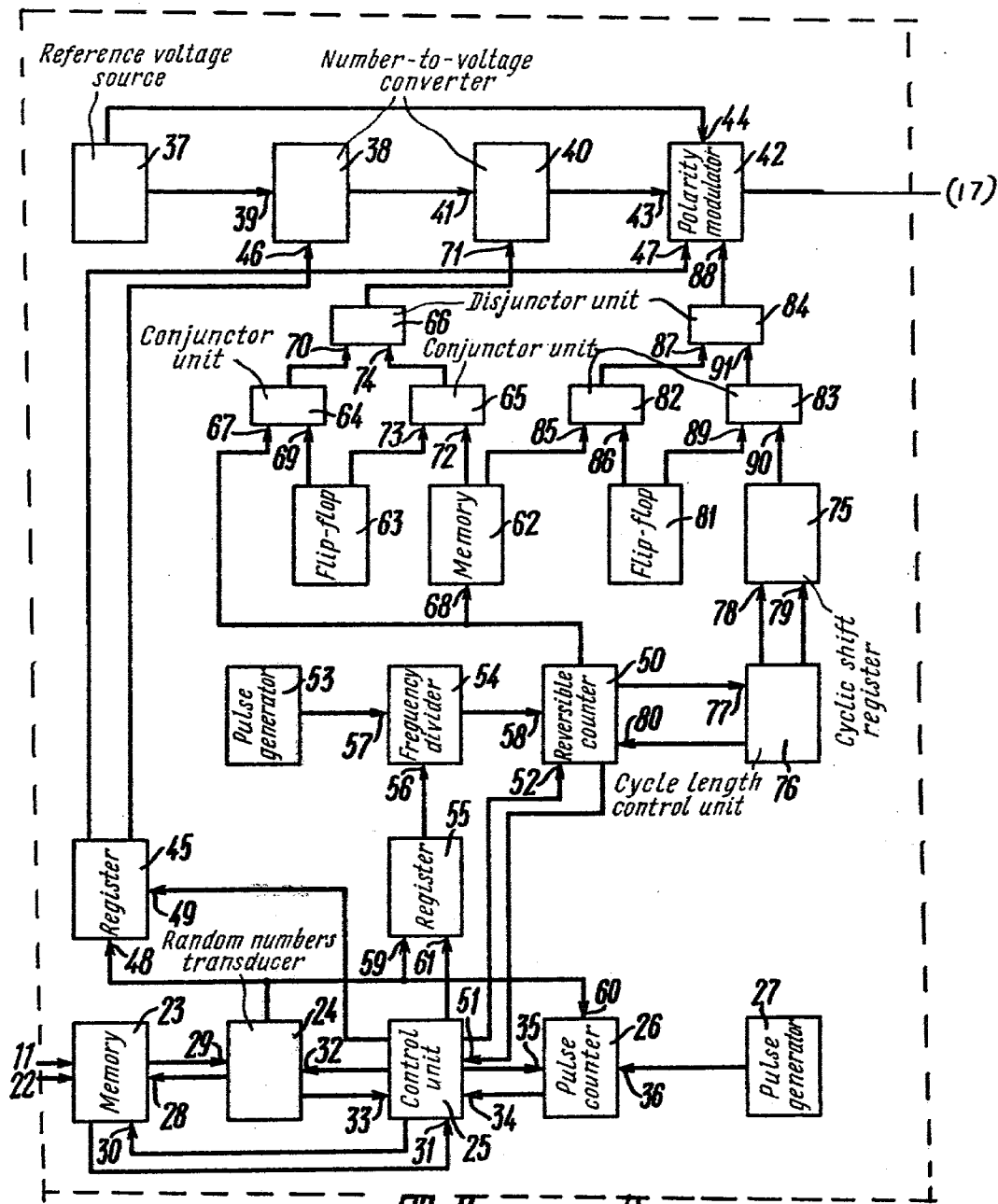
FIG. 2 is a block diagram of a digital controlled random actions simulator, in accordance with the invention, which ensures the formation of pulse signals of an arbitrary shape.

The digital controlled random actions simulator 10 (FIG. 2) comprises in series a memory 23, a random numbers transducer 24, a control unit 25, a pulse counter 26, and a pulse generator 27. An input 28 and an output of the memory 23 are respectively connected to an output and an input 29 of the random numbers transducer 24. An input 30 and an output of the memory 23 are respectively connected to an output and an input 31 of the control unit 25. Third and fourth inputs of the memory 23 are connected to the inputs 11 and 22, respectively, of the digital controlled random actions simulator 10.

An input 32 and an output of the random numbers transducer 24 are respectively connected to an output and an input 33 of the control unit 25. An output and an input 34 of the control unit 25 are respectively connected to an input 35 and an output of the pulse counter 26. Another input 36 of the pulse counter 26 is connected to an output of the pulse generator 27.

The digital controlled random actions simulator 10 further includes a reference voltage source 37; a number-to-voltage converter 38 whose input 39 is connected to an output of the reference voltage source 37; a number-to-voltage converter 40 whose input 41 is connected to an output of the number-to-voltage cnverter 38; and a polarity modulator 42 whose input 43 is connected to an output of the converter 40. An input 44 of the modulator 42 is connected to the output of the source 37. The output of the modulator 42 is connected to the output of the digital controlled random actions simulator 10. Also included is a register 45 whose first output is connected to an input 46 of the converter 38 and whose second output is connected to the input 47 of the polarity modulator 42. An input 48 of the register 45 is connected to another output of the random numbers transducer 24 and an input 49 is connected to another output of the control unit 25. The simulator 10 also includes a reversible counter 50. One of the outputs of the reversible counter 50 is connected to an input 51 of the control unit 25. Another output of the control unit 25 is connected to an input 52 of the reversible counter 50. The simulator 10 also includes a pulse generator 53, a frequency divider 54, and a register 55. An output of the register 55 is connected to an input 56 of the frequency divider 54. An input 57 of the frequency divider 54 is connected to an output of the pulse generator 53 and its output is connected to an input 58 of the reversible counter 50. An input 59 of the register 55 and an input 60 of the pulse counter 26 are connected to the third output of the random numbers transducer 24. An input 61 of the register 55 is connected to a respective output of the control unit 25.

The reversible counter 50 is electrically coupled to the number-to-code converter 40 via a memory 62, a flip-flop 63, conjunctor units 64 and 65 and a disjunctor unit 66. An input 67 of the conjunctor unit 64 is connected to another output of the reversible counter 50, which is also connected to an input 68 of the memory 62. An input 69 of said conjunctor unit 64 is connected to an output of the flip-flop 63 and its output is connected to an input 70 of the disjunctor unit 66. The output of the disjunctor unit 66 is connected to an input 71 of the number-to-voltage converter 40. An input 72 of the conjunctor unit 65 is connected to a respective output of the memory 62, an input 73 of said conjunctor unit 65 is connected to another output of the flip-flop 63, and an output of said conjunctor unit 65 is connected to an input 74 of the disjunctor unit 66. The digital controlled random actions simulator 10 further includes a cyclic shift register 75 and a cycle length control unit 76. An input 77 of the cycle length control unit 76 is connected to a respective output of the reversible counter 50, two of its outputs are connected to inputs 78 and 79 of the cyclic shift register 75, and its third output is connected to an input 80 of the reversible counter 50. The simulator 10 further includes a flip-flop 81, conjunctors 82 and 83 and a disjunctor 84. An input 85 of the conjunctor 82 is connected to a respective output of the memory 62, its input 86 is connected to an output of the flip-flop 81, and its output is connected to an input 87 of the disjunctor 84. The output of the disjunctor 84 is connected to an input 88 of the polarity modulator 42. An input 89 of the conjunctor 83 is connected to the output of the flip-flop 81, its input 90 is connected to an output of the cyclic shift register 75, and its output is connected to an input 91 of the disjunctor 84.

Figure 3:
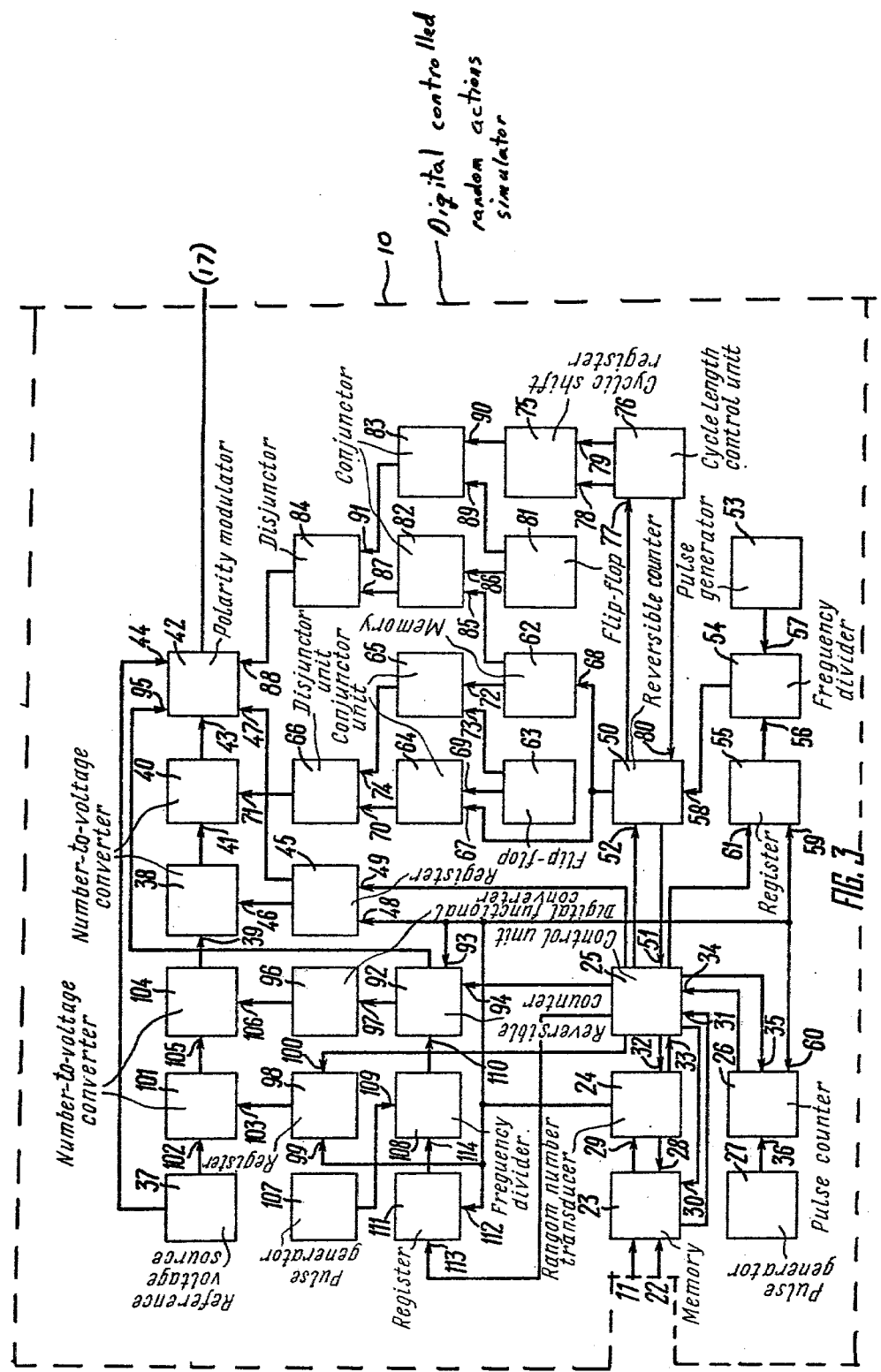
FIG. 3 is a block diagram of another embodiment of a digital controlled random actions simulator, in accordance with the invention, which ensures the formation of pulse signals modulated by either harmonic signals with a random and statistically independent amplitude, phase and duration, or a combination of harmonic signals.

FIG. 3 illustrates an embodiment of the digital controlled random actions simulator 10 which comprises a reversible counter 92 whose input 93 is connected to the third respective output of the random numbers transducer 24. An input 94 of said reversible counter 92 is connected to a respective output of the control unit 25 and one of its outputs is connected to an input 95 of the polarity modulator 42. The simulator 10 also includes a digital functional converter 96 whose input 97 is connected to an output of the reversible counter 92. The simulator 10 further incorporates a register 98 whose input 99 is connected to the third respective output of the random numbers transducer and whose input 100 is connected to a respective output of the control unit 25. The simulator 10 further includes a number-to-voltage converter 101 whose input 102 is connected to the output of the reference voltage source 37 and whose input 103 is connected to an output of the register 98. The simulator 10 still further includes a number-to-voltage converter 104 whose input 105 is connected to an output of the number-to-voltage converter 101, whose input 106 is connected to an output of the digital functional converter 96, and whose output is connected to the input 39 of the number-to-voltage converter 38.

The digital controlled random numbers simulator 10 also comprises a pulse generator 107 and a frequency divider 108. The input 109 of the frequency divider 108 is connected to an output of the pulse generator 107 and its output is connected to an input 120 of the reversible counter 92. The simulator 10 also contains a register 111 whose input 112 is connected to the third respective output of the random numbers transducer 24, whose input 113 is connected to the third respective output of the control unit 25 and whose output is connected to an input 114 of the frequency divider 108.

According to another preferred embodiment, the digital controlled random actions simulator 10 comprises harmonic oscillators $115_1, 115_2, \ldots, 115_8$ (FIG. 4) having combined outputs, and initial conditions registers $116_1, 116_2, \ldots, 116_8$ whose outputs are connected to inputs $117_1, 117_2, \ldots, 117_8$ of respective harmonic oscillators $115_1, 115_2, \ldots, 115_8$. The simulator 10 also includes a distributor 118 having a first group of outputs connected to inputs $119_1, 119_2, \ldots, 119_8$ of respective harmonic oscillators $115_1, 115_2, \ldots, 115_8$, and a second group of outputs connected to inputs $120_1, 120_2, \ldots, 120_8$ of respective harmonic oscillators $115_1, 115_2, \ldots, 115_8$. A single output of said distributor 118 is connected to inputs $121_1, 121_2, \ldots, 121_8$ of the harmonic oscillators $115_1, 115_2, \ldots, 115_8$.

The simulator 10 also includes a distributor 122, having a group of outputs connected to inputs $123_1, 123_2, \ldots, 123_8$ of the respective registers $116_1, 116_2, \ldots, 116_8$. One of its outputs is connected to inputs $124_1, 124_2, \ldots, 124_8$ of the harmonic oscillators $115_1, 115_2, \ldots, 115_8$, and its other output is connected to an input $124_1$ of the distributor 118. The simulator 10 further includes a result accumulator 125 and a synchronization unit 126. A group of inputs $127_1, 127_2, \ldots, 127_8$ of the synchronization unit 126 is connected to a respective group of outputs of the result accumulator 125. Outputs of the synchronization unit 126 are connected to inputs 128, 129 and 130, respectively, of the result accumulator 125. An input 131 of the result accumulator 125 is connected to the outputs of the harmonic oscillators $115_1, 115_2, \ldots, 115_8$. An output of the synchronization unit 126 is connected to an input 132 of the distributor 118 and an input 133 of the synchronization unit 126 is connected to the output of the distributor 118. The simulator 10 also includes a pulse generator 134, a frequency divider 135, a frequency divider 136 and a frequency division factor codes register 137. An output of the pulse generator 134 is connected to inputs 138 and 139, respectively, of the frequency dividers 135 and 136 and to an input 140 of the synchronization unit 126. An output of the register 137 is connected to inputs 141 and 142, respectively, of the dividers 135 and 136. An output of the frequency divider 135 is connected to an input 143 of the result accumulator 125 and an input 144 of the distributor 118.

The simulator 10 further includes a memory 145, a random numbers transducer 146 and a pulse counter 147. An output and an input 148 of the memory 145 are respectively connected to an input 149 and an output of the random numbers transducer 146. An input 150 of the random numbers transducer 146 and an input 151 of the counter 147 are combined and connected to the output of the distributor 122. Another output of the random numbers transducer 146 is connected to an input 152 of the counter 147. An input 153 of the pulse counter 147 is connected to an output of the frequency divider 136. An output of the counter 147 is connected to an input 154 of the distributor 122. The simulator 10 further comprises a decoder 155, a memory 156, a pulse counter 157 and a commutator 158. Inputs of the commutator 158 are connected to the inputs 11 and 22, respectively, of the simulator 10. A first output of said commutator 158 is connected to an output 159 of the counter 157 and its second output is connected to an input 160 of the register 137, and input 161 of the memory 145, an input 162 of the memory 156, and inputs 163 and $164_1, 164_2, \ldots, 164_8$ of the distributor 122 and the registers $116_1, 116_2, \ldots, 116_8$, respectively. An output of the counter 157 is connected to an input 165 of the memory 145, an input 166 of the memory 156 and an input 167 of the decoder 155. A group of outputs of the decoder 155 is connected to inputs $168_1, 168_2, \ldots, 168_8$, respectively, of the registers $116_1, 116_2, \ldots, 116_8$. Two separate outputs of said decoder 155 are connected to inputs 169 and 170 of the distributor 122 and another output of said decoder 155 is connected to an input 171 of the register 137. An input 172 of the memory 156 is connected to a respective output of the distributor 118. An output of the memory 156 is connected to an input 173 of the result accumulator 125. The last output of the random number transducer 146 is connected to inputs $174_1, 174_2, \ldots, 174_8$ of the registers $116_1, 116_2, \ldots, 116_8$.

The simulator 10 further includes a number-to-voltage converter 175 whose output is connected to the output of the simulator 10, and an actual process value code register 176 whose output is connected to an input 177 of the converter 175. An input 178 of the register 176 is connected to the output of the result accumulator 125, an input 179 of said register 176 is connected to the third respective output of the distributor 122, and an input 180 is connected to a respective output of the distributor 118 and to an input 181 of the distributor 122.

Each of the harmonic oscillators $115_1, 115_2, \ldots, 115_8$ comprises a conjunctor 182 (FIG. 5), a reversible counter 183, a code converter 184 and a multiplexer 185. Inputs of the conjunctor 182 are connected, for example, to the inputs $119_1$ and $121_1$ of the harmonic oscillator 115₁. An output of the conjunctor 182 is connected to an input 186 of the reversible counter 183, other inputs are connected to the inputs 124₁ and 117₁, respectively, of the harmonic oscillator 115₁. An output of the reversible counter 183 is connected to an input 187 of the code converter 184. The output of the converter 184 is connected to an input 188 of the multiplexer 185 other input is connected to the input 120₁ of the harmonic oscillator 115₁. An output of said multiplexer 185 is connected to the output of said harmonic oscillator 115₁.

The distributor 118 (FIG. 6) comprises a shift register 189, a flip-flop 190, conjunctors 191, 192 and 193 and a disjunctor 194. An input 195 of the register 189 and to an input 196 of the conjunctor 191 are connected to an output of the conjunctor 193. Outputs of the register 189 are connected to a respective group of outputs of the distributor 118. One output of the register 189 is connected to an input 197 of the conjunctor 191. Outputs of the conjunctors 191 and 192 are connected to inputs 198 and 199 of the disjunctor 194. The output of the conjunctor 191 is also connected to a respective output of the distributor 118. An output of the disjunctor 194 is connected to an input 200 of the flip-flop 190.

The distributor 118 further includes a pulse counter 201 whose input 202 is connected to the input 195 of the register 189, the input 196 of the conjunctor 191 and the output of the conjunctor 193. An input 203 of the conjunctor 193 is connected to an output 204 of the flip-flop 190 and the output of the distributor 118. One input of the conjunctor 193 is connected to the input 132 of the distributor 118. An input 205 of the counter 201, an input 206 of the conjunctor 192 and an input 207 of the register 189 are combined and connected to a respective output of the flip-flop 190. One input of the conjunctor 192 is connected to the input 144 of the distributor 118 and another input of said conjunctor 192 is connected to the output 124' of the distributor 118. The distributor 118 still further includes a decoder 208 whose input 209 is connected to an output of the counter 201 and a respective output of the distributor 118. Outputs of the decoder 208 are connected to a respective group of outputs of the distributor 118.

Figure 7:
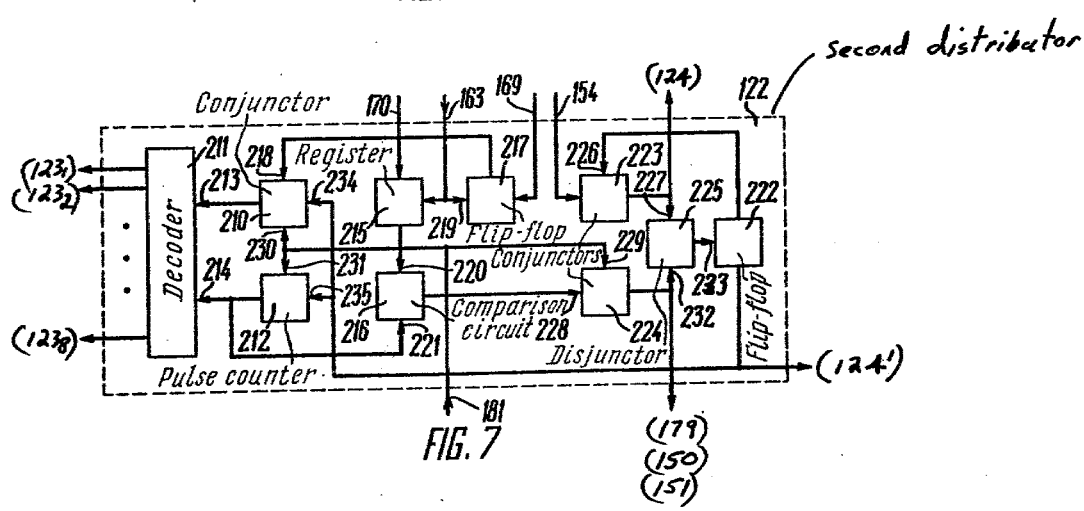
FIG. 7 is a block diagram of the second distributor in accordance with the invention.

The distributor 122 (FIG. 7) comprises a conjunctor 210, a decoder 211, and a pulse counter 212. An input 213 of the decoder 211 is connected to an output of the conjunctor 210. An input 214 of said decoder 211 is connected to an output of the pulse counter 212. Outputs of the decoder 211 are connected to the group of outputs of the distributor 122. The distributor 122 further includes a register 215, a comparison circuit 216 and a flip-flop 217, whose output is connected to an input 218 of the conjunctor 210. An input 219 of the flip-flop 217 and one input of the register 215 are combined and connected to the input 163 of the distributor 122. Another input of the register 215 is connected to the input 170 of the distributor 122. An input 220 of the comparison circuit 216 is connected to an output of the register 215. An input 221 of said comparison circuit 216 is connected to the output of the pulse counter 212. An input of the flip-flop 217 is connected to the input 169 of the distributor 122. The distributor 122 also includes a flip-flop 222, conjunctors 223 and 224 and a disjunctor 225. One input of the conjunctor 223 is connected to the input 154 of the distributor 122. An input 226 of said conjunctor 223 is connected to a respective output of the flip-flop 222. An output of the conjunctor 223 is connected to an input 227 of the disjunctor 225 and a respective output of the distributor 122. An input 228 of the conjunctor 224 is connected to the output of the comparison circuit 216. An input 229 of said conjunctor 224 is connected to an input 230 of the conjunctor 210, an input 231 of the pulse counter 212 and the input 181 of the distributor 122.

An output of the conjunctor 224 is connected to an input 232 of the disjunctor 225 and a respective output of the distributor 122. An output of the disjunctor 225 is connected to an input 233 of the flip-flop 222, whose other output is connected to an input 234 of the conjunctor 210, an input 235 of the counter 212 and a respective output of the distributor 122.

Figure 8:
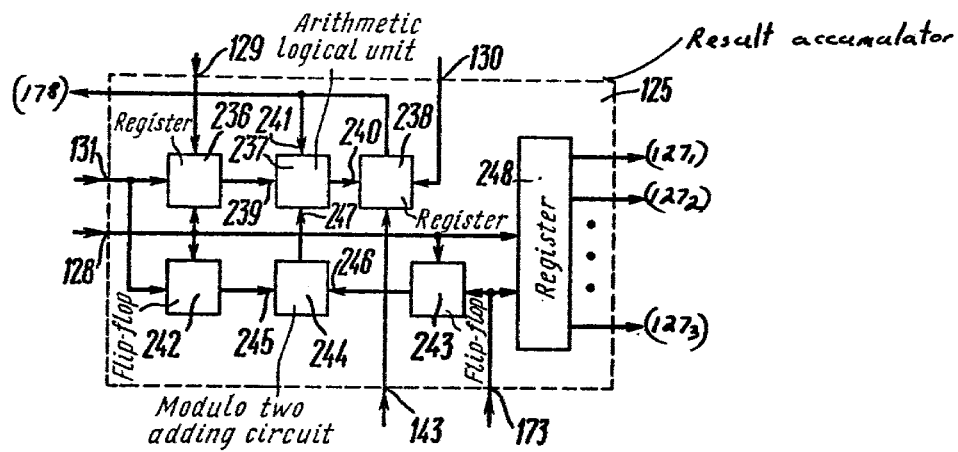
FIG. 8 is a block diagram of a result accumulator in accordance with the invention.

The result accumulator 125 (FIG. 8) comprises a register 236, an arithmetic logical unit 237 and a register 238. Inputs of the register 236 are connected to the inputs 131 and 129, respectively, of the result accumulator 125. An output of said register 236 is connected to an input 239 of the arithmetic logical unit 237, whose output is connected to an input 240 of the register 238. The inputs of the register 238 are connected to the inputs 143 and 130, respectively, of the result accumulator 125. An output of the register 238 is connected to an input 241 of the arithmetic logical unit 237 and the output of the result accumulator 125. The result accumulator 125 further includes a flip-flop 242, a flip-flop 243 and a modulo two adding circuit 244. An input of the flip-flop 242 is connected to an input of the flip-flop 243, a respective input of the register 236 and the input 128 of the result accumulator 125. Inputs 245 and 246 of the circuit 244 are respectively connected to outputs of the flip-flops 242 and 243. The output of said circuit 244 is connected to an input 247 of the arithmetic logical unit 237.

Another input of the flip-flop 242 is connected to the input 131 of the result accumulator 125. The accumulator 125 still further includes a register 148 whose inputs are connected to the inputs 128 and 173, respectively, of the result accumulator 125.

Outputs of the register 248 are respectively connected to the group of outputs of the result accumulator 125.

The synchronization unit 126 (FIG. 9) comprises flip-flops 249 and 250, conjunctors 251 and 252 and a disjunctor 153 whose output is connected to an input 254 of the flip-flop 249. An output of said flip-flop 249 is connected to an input 255 of the flip-flop 250. Another output of said flip-flop 249 is connected to an input 256 of the disjunctor 253.

Outputs of the flip-flop 250 are connected to inputs 257 and 258 of the conjunctors 251 and 252, respectively. Inputs 259 and 260 of said conjunctors 251 and 252, respectively, are combined and connected to an input 261 of the flip-flop 250. An output of the conjunctor 251 is connected to a respective output of the synchronization unit 126. The synchronization unit 126 further includes a shift register 262, a conjunctor 263 and a disjunctor 264.

An output of the conjunctor 263 is connected to a respective output of the synchronization unit 126. An input 265 of said conjunctor 263 is connected to an input 266 of the register 262, an output of the conjunctor 252, an input 267 of the disjunctor 253 and the output of the synchronization unit 126.

Outputs of the register 262 are connected to inputs 268₁, 268₂, ..., 268₈ of the disjunctor 264. One output of the register 262 is connected to an input 269 of the conjunctor 263 and an input 270 of the disjunctor 253.

Other inputs of the disjunctor 264 are connected to the group of inputs 127₁, 127₂, ..., 127₈ of the synchronization unit 126. An output of said disjunctor 264 is connected to an input 271 of the conjunctor 251. An input 272 of the register 262 is connected to the first output of the flip-flop 249.

The synchronization unit 126 further includes conjunctors 273 and 274 and a flip-flop 275. An input 276 of the conjunctor 273 is connected to the first output of the flip-flop 249. An output of the conjunctor 273 is connected to the input 261 of the flip-flop 250 and the inputs 259 and 260 of the conjunctors 251 and 252, respectively.

An input 277 of the flip-flop 275 is connected to an input 278 of the conjunctor 274 and the second respective output of the flip-flop 249. An output of the conjunctor 274 is connected to an input 279 of the disjunctor 253.

The synchronization unit 126 still further includes conjunctors 280 and 281. An input of the conjunctor 280 is connected to a respective input of the conjunctor 273 and the input 140 of the synchronization unit 126.

An input 282 of the conjunctor 281, an input 283 of the flip-flop 275 and an input 284 of the conjunctor 274 are connected to an output of the conjunctor 280. An input 285 of the conjunctor 281 is connected to an output of the flip-flop 275, whose second output is connected to an input 286 of the conjunctor 274. An input 287 of the conjunctor 280 and an input 288 of the conjunctor 281 are connected to the second output of the flip-flop 249. Another input of the conjunctor 280 is connected to the input 133 of the synchronization unit 126. An output of the conjunctor 281 is connected to a respective output of the synchronization unit 126.

The proposed digital simulator-computer system makes it possible to test objects and articles for reliability, durability, survival and other parameters when subjected to the effects of random, deterministic or mixed actions similar to those that are encountered in the course of operation.

Prior to testing, random actions, to which an object is subjected in the course of operation, are recorded on an information carrier. The volume of information on the recorded actions is determined by the desired accuracy of reproducing the spectral and statistical characteristics while simulating these actions. The information on the recorded actions is entered in the control computer 1 (FIG. 1) in order to determine the spectral composition and statistical characteristics of these actions. The calculated spectral composition and statistical characteristics of the recorded actions serve as the initial data for calculating the parameters for adjusting the digital controlled random actions simulator 10 incorporated in the auxiliary forward channel. The control computer 1 can select any operating mode for the digital controlled random actions simulator 10, which makes it possible:

to simulate a random pulse process, wherein the amplitude, duration and polarity of pulses and the duration of intervals between pulses are random parameters whose spectral and statistical characteristics approximate those of the recorded random actions;

to simulate a random pulse process as a train of pulses of an arbitrary shape with random and independent pulse signal parameters;

to simulate a random pulse process as a train of pulses modulated by harmonic signals with a random and statistically independent amplitude, phase and frequency; and to simulate a random pulse process as a train of pulses modulated by a combination of harmonic signals with a random and statistically independent amplitude, phase and frequency.

Upon adjusting the digital controlled random actions simulator 10, the random pulse process is applied via the distribution device 14 to the input of the test bed 9. In order to adjust the random actions' characteristics, the simulating random pulse process is applied from the output of the test bed 9 via the distribution device 18 to the input of the auxiliary feedback channel which performs the spectral and statistical analysis of the random process. The results of the spectral and statistical analysis are applied from the output of the auxiliary feedback channel via the interface unit 2 to the control computer 1 and serve to correct the adjustment of the digital controlled random actions simulator 10, which operation is carried out by the auxiliary forward channel. In some cases, it is possible to adjust the digital controlled random actions simulator 10 directly from the output of the multifunctional statistical analyzer 12 incorporated in the auxiliary feedback channel.

Thus, by varying the probability characteristics at the input of the test bed 9, it is possible to adjust the characteristics of the simulating pulse process at the output of said test bed 9.

Operation of the proposed digital simulator-computer system will be considered with reference to the following three basic modes:

reproduction of deterministic actions upon an object;
reproduction of random actions upon an object; and
reproduction of mixed actions upon an object.

In the course of operation of the proposed digital simulator-computer system, a number of closed control loops are brought into play.

The first closed control loop is intended to reproduce deterministic actions and comprises the control computer 1, the interface unit 2, the main forward channel 5, the first distribution device 14, the test bed 9, the second distribution device 18, the main feedback channel 7, the interface unit 2 and the control computer 1.

The second closed control loop is intended to reproduce random actions and comprises the control computer 1, the interface unit 2, the auxiliary forward channel comprising at least one digital controlled random actions simulator 10, the first distribution device 14, the test bed 9, the auxiliary feedback channel comprising at least one digital multifunctional statistical analyzer 12, the interface unit 2 and the control computer 1.

The third closed control loop is intended to reproduce random actions and comprises the auxiliary forward channel comprising at least one digital controlled random actions simulator 10, the first distribution device 14, the test bed 9, the second distribution device 18 and the auxiliary feedback channel comprising at least one digital multifunctional statistical analyzer 12.

The fourth closed control loop is intended to reproduce mixed actions upon an object being tested and comprises all the units of the digital simulator-computer system in accordance with the invention.

Deterministic actions can be reproduced, for example, by argument quantization of a preset time function, coding the samples values of the preset time function and representing this function as a sequence of codes formed or stored by the control computer.

When simulating a preset time function, the code sequence is transmitted via the interface unit 2 to the forward channel 5 which converts it, for example, to voltage levels which are applied by the distribution device 14 to the input of the test bed 9. Units (not shown) of the test bed 9 convert the voltage levels to signals which approximately, but with a desired accuracy, reproduce the predetermined time function. Signals of control and measuring instruments (not shown) of the test bed 9 are applied via the distribution device 18 to the feedback channel 7 which converts them to code sequences transmitted by the interface unit 2 to the control computer 1.

Thus deterministic loads are fully reproduced by the first closed control loop of the proposed digital simulator-computer system.

Referring to the simulation of random actions, consider first operation of the second closed control loop in the case of reproducing a non-stationary random process with the distribution density of the simulating random place process changing over equal periods of time.

At the beginning of each of the equal periods of time, the control computer 1 readjusts, through the interface unit 2, the digital controlled random actions simulator 10, which operation is carried out by the auxiliary forward channel. As a result, the simulating random pulse process has a desired distribution density during each of the equal periods of time. The output signals of the auxiliary forward channel are transmitted by the distribution device 14 to the input of the test bed 9. From the output of the test bed 9, the signals are applied via the distribution device 18 to the input of the auxiliary feedback channel which performs a preliminary statistical analysis of the supplied information and sends the results of the preliminary analysis to the control computer 1 via the interface unit 2. The use of the multifunctional statistical analyzer 12 in the auxiliary feedback channel speeds up the analysis, which, in turn, extends the frequency range of processes subject to analysis and thus expands the functional potentialities of the system.

If necessary, the control computer 1 can, on the basis of the results of the preliminary statistical analysis, adjust the characteristics of the output process of the auxiliary forward channel.

Thus random actions are fully reproduced by the second closed control loop of the proposed digital simulator-computer system.

Consider operation of the third closed control loop of the system, which is intended to switch off the control computer 1 for the testing period. Let it be assumed that in the course of simulating random actions there is formed a train of triangular pulses having random amplitudes, durations and polarities and recurring over random time intervals. All the foregoing parameters possess a desired distribution function.

After the digital controlled random actions simulator 10 has been adjusted by the auxiliary forward channel, the digital simulator-computer system starts reproducing random actions with the third closed control loop working off-line.

Under such operating conditions, the auxiliary feedback channel transmits the results of the analysis to the auxiliary forward channel, which makes it possible to automatically adjust the parameters of the simulating random pulse process at the output of the auxiliary forward channel and bring them closer to the rated values, for example, a minimum peak load, random actions dispersion, mathematical expectation period and other parameters.

While performing tests, the commonest operating mode of the system is the reproduction of random actions by the third control loop, when the control computer 1 is disconnected from the digital simulator-computer system for the off-line operation period of the third control loop. This also helps to increase the utilization factor of the proposed digital simulator-computer system.

The reproduction of complex test programs including areas of deterministic actions, stationary random actions and non-stationary random actions, for example, in cases of a variable mathematical expectation period of the simulating random pulse process, requires the use of all the units incorporated in the digital simulator-computer system. When reproducing deterministic and stationary random actions, the system operates in the first and second modes, respectively. Consider therefore the reproduction of a simulating random pulse process with a controlled mathematical expectation $m_1(t)$ set as a time function. The control computer 1 calculates adjustment parameters of the digital controlled random actions simulator 10, which is done by the auxiliary forward channel; the parameters to be calculated are selected so that the output random process of said simulator 10 should have a constant mathematical expectation, $m_2(t) = = m_2 = \text{const}$. Via the interface unit 2, the control computer 1 then adjusts the digital controlled random actions simulator 10 and forms a deterministic time function $m_3(t) = = m_1(t) - m_2$. Subsequent operation of the digital simulator-computer system is fully in correspondence with the abovedescribed modes of reproducing deterministic and stationary random actions upon an object being tested; signals from the outputs of both forward channels are added together by the first distribution device 14 from whose output to the input of the test bed 9 there is applied a non-stationary random process with a predetermined variation of the mathematical expectation $m_1(t)$.

Thus the proposed digital simulator-computer system reproduces mixed actions.

The proposed digital simulator-computer system makes the testing conditions more compatible with the actual operating conditions of objects subjected to testing, as compared to other systems intended to serve similar purposes, which is due to the use of the digital controlled random actions simulator 10 and the digital multifunctional statistical analyzer 12. The units 10 and 12 reproduce with a desired accuracy the statistical and spectral characteristics of the simulating random pulse process and recorded random actions under actual operating conditions.

The testing of objects in operating conditions is made faster and easier by making the testing conditions, simulated by the proposed digital simulator-computer system, more compatible with the actual operating conditions of objects being tested.

The control of parameters of reproduced actions upon an object being tested is simplified by forming statistically independent random parameters of pulses of the simulating random pulse process, as well as by the use in the simulating random pulse process of pulses of different shapes selected from a preset combination of pulse shapes.

Thus the proposed digital simulator-computer system provides for a high effectiveness of testing, as well as a high utilization factor of the control and testing equipment.

Consider now operation of different embodiments of the digital controlled random actions simulator 10.

Prior to the start of operation of the digital controlled random actions simulator 10, a sequence of codes is entered in the first memory 23 (FIG. 2), which codes determine the type and numerical characteristics of random parameters distribution functions of pulses of the simulating random pulse process.

Figure 10:
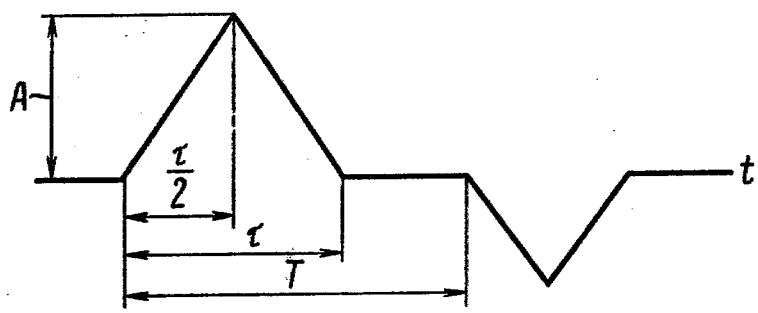
FIG. 10 is an illustration of a simulating random pulse process with isosceles triangle-shaped pulses having a random amplitude A, a random duration $\tau$ and a random polarity, as well as random intervals T between pulses.

Each operational cycle of the digital controlled random actions simulator 10 starts with forming a group of random numbers which set the amplitude and duration values of pulses, as well as the value of intervals between pulses. At this stage, the control unit 25, intended to synchronize operation of and ensure interaction between all the units of the system, successively connects the random numbers transducer 24 to different regions of the first memory 23. First, the random numbers transducer 24 is connected to the region for storing codes for setting the pulse amplitude distribution pattern, then to the region for storing codes for setting the pulse duration distribution pattern, and, finally, to the region for storing codes for setting the distribution pattern for intervals between pulses. The first number of the group of random numbers determines the amplitude A (FIG. 10) of the pulse signal being formed, and is entered, by a signal from the control unit 25, in the first register 45.

The second random number determines the duration $\tau$ of the pulse signal and is entered, by a signal from the control unit 25 (FIG. 2), in the register 55. The third random number determines the duration T (FIG. 10) of intervals between the formed pulse signals and is entered, by a signal from the control unit 25 (FIG. 2), in the pulse counter 26.

First, at the output of the reference voltage source 37 there is set a voltage level equal to a maximum amplitude value of the formed pulse signals. According to the code of the random numbers entered in the first register 45, at the output of the first number-to-voltage converter 38 there are formed voltage levels ranging from zero to the maximum value set at the output of the reference voltage source 37.

In the initial state, the reversible counter 50 contains zero code. As the reversible counter 50 is filled from zero to the maximum value, at the output of the second converter 40 there is formed a leading edge of a triangular pulse signal. The reversible counter 50 is filled at a constant frequency of input pulses, so the increments in the output voltage of the second converter 40 are also constant, hence, the leading edge of the formed triangular pulse signal is shaped as a slanted straight line.

As soon as there is a unity code at each position of the reversible counter 50, it starts counting in reverse. At this instant the formation of the leading edge of the pulse signal is ended; the voltage at the output of the number-to-voltage converter 40 is equal to the initial voltage.

The countdown frequency of the reversible counter 50 is equal to the forward count frequency; hence, the duration of the trailing edge of the signal being formed is equal to the duration of its leading edge. Thus the reversible counter 50 forms a code sequence which linearly increases to reach a maximum value and then linearly decreases so that the pulse signal is shaped as an isosceles triangle.

The polarity modulator 42 passes the pulse signal from the output of the number-to-code converter 40 to the output of the digital controlled random actions simulator 10; as this takes place, the polarity is not changed, or is changed, depending upon the code entered in the first register 45. For example, if the register 45 contains a code determining the amplitude value of the pulse signal, and if the value of said code corresponds to the negative subregion of the region for determining the distribution function of random signal amplitudes, the polarity modulator 42 changes the signal polarity.

The output pulse signals arriving at the input of the polarity modulator 42 from the second number-to-voltage converter 40 are shaped as stepped isosceles triangles because of the discrete increments in the amplitude; for that reason, the polarity modulator 42 also smoothes the leading edges of the pulse signals.

The random number, entered in the register 55, sets a required scaling factor of the frequency divider 54. This means that with each duration value $\tau$ (FIG. 10) of the formed pulse signal, the reversible counter 50 (FIG. 2) is filled at a respective frequency resulting from the division of the pulse flow arriving via the frequency divider 54 to the reversible counter 50 from the second pulse generator 53. The purpose of thus controlling the rate of filling of the reversible counter 50 is to enable said reversible counter 50 (FIG. 2) to complete a double cycle, i.e. to count from zero to a maximum value and in reverse, with any value of the duration $\tau$ (FIG. 10) of the formed pulse signal. This accounts for a strictly symmetrical isosceles triangle shape of the pulse signal regardless of a combination of its amplitude A (FIG. 10) and duration $\tau$.

With the aid of the first pulse generator 27 (FIG. 2) and the pulse counter 26, the random code stored in the pulse counter 26 is converted to a time interval between pulses being formed. As the formation of the time interval between pulses is completed, the control unit 25 takes care of a new operating cycle of the digital controlled random actions simulator 10.

Thus the digital controlled random actions simulator 10 forms isosceles triangle-shaped pulse signals; the amplitude and duration of these pulses, as well as the intervals between them, are random and distributed according to a specified pattern.

Consider operation of the digital controlled random actions simulator 10 in the case of forming pulse signals of an arbitrary shape.

The process of producing triangular pulses is identical with what is described above. To ensure this operating mode, the flip-flop 63 is set in advance, and the enabling signal is applied from its first output to the conjunctor unit 64. The flip-flop 81 is reset in advance, and the enabling signal is applied from its second output to the conjunctor 83. At this stage, the cyclic shift register 75 contains zero code, whereas the cycle length control unit 76 contains the code 00...01, which means it operates in the mode of producing a single pulse signal.

The interaction between the cycle length control unit 76 and the cyclic shift register 75 makes it possible to form a predetermined number of pulses in a group of successively recurring pulses at the output of the digital controlled random actions simulator 10.

Upon completing the formation of a single pulse signal the reversible counter 50 discontinues counting pulses by a signal from the control unit 76.

A group of successively following pulses with a predetermined sequence of polarity changes is formed as follows. First, in the cycle length control unit 76 there is entered a code which sets the number of pulse signals in the group. Then, in the first positions of the cyclic shift register 75, whose number is determined by the number of pulse signals in the group, there is entered a sequence of binary digits which determine the order of changing the polarity of pulse signals in the group. By a signal from the second output of the cycle length control unit 76, the cyclic shift register 75 switches the internal feedback circuit from its output to the input of a position whose number is indicated by the code of the number of pulse signals in the group of pulses.

From the output of the cyclic shift register 75, the signal is applied via the conjunctor 83 and disjunctor 84 to the input 88 of the polarity modulator 42 and determines the sign of the pulse signal at the output of the digital controlled random actions simulator 10. The end of a complete operating cycle of the reversible counter 50, which includes forward count from zero to a maximum code value and counting in reverse, corresponds to the end of each pulse. At the end of each pulse, a signal arriving from the output of the cycle length control unit 76 shifts by one digit the code stored in the cyclic shift register 75. Upon completing the formation of the group of pulses, the cyclic shift register assumes its initial state by switching back the feedback circuit. The cycle length control unit 76 produces an end of operation signal for the reversible counter 50.

As the flip-flop 63 is reset, the enabling signal is applied from its output to the second conjunctor unit 65. A sequence of ordinates codes of the time function, which determines the shape of the output pulse signal of the digital controlled random actions simulator 10, is entered in advance in the memory 62. These codes arrive from the output of the memory unit 62 via the conjunctor unit 65 and disjunctor unit 66 to the input of the number-to-voltage converter 40. Sequential selection of codes from the memory 62 is carried out by signals from the output of the reversible counter 50. Under such operating conditions, at the output of the digital controlled random actions simulator 10 there are formed pulse signals of a desired shape, the polarity and the number of said signals in the group being determined by signals arriving from the outputs of the register 45 and the cyclic register 75.

As the flip-flop 81 is set in advance, the enabling signal is applied from its output to the first conjunctor 82; as codes are selected from the memory 62, signals are applied from its output via the conjunctor 82 and disjunctor 84 to the inputs of the polarity modulator 42.

Consider operation of the digital controlled random actions simulator 10 in the case of forming pulse signals modulated by harmonic signals.

The interaction between the second flip-flop 81, the first and second conjunctors 82 and 83, respectively, and the disjunctor 84 ensures separate transmission of codes from the outputs of the memory 62 and the cyclic shift register 75 to the polarity modulator 42.

Thus the digital controlled random actions simulator 10 makes it possible to produce pulse signals of arbitrary shapes, which, in turn, makes it possible for the digital simulator-computer system to reproduce a broader range of spectral and statistical characteristics of random actions.

For the sake of simplicity, the time function determining the shape of the output signal of the digital controlled random actions simulator 10 is represented as follows:

$$Q(t) = U_1(t)U_2(t)U_3(t)U_4(t)U_5(t) \quad (1)$$

where $U_1(t)$, $U_2(t)$, $U_3(t)$ and $U_4(t)$ are transfer functions of the number-to-voltage converters 38, 40, 101 (FIG. 3) and 104, respectively, and $U_5(t)$ is the transfer function of the polarity modulator 42.

The mode, whereby the transfer functions of the number-to-voltage converters 101 and 104 are equal to unity, ensures the formation of a flow of pulses of opposite polarities with random and independent parameters distributed in accordance with a specified pattern.

The formation of pulses of a predetermined shape is described above.

This mode is set by applying a control signal from the control unit 25 to the input 94 of the reversible counter 92. As a result, the reversible counter 92 and register 98, and, consequently, the digital functional converter 96 and number-to-voltage converters 101 and 104 are found in a steady state, whereby the output potential of the reference voltage source 37 is applied to the input of the first number-to-voltage converter 38 without any scale conversion.

The formation of a random pulse flow with a predetermined spectral power density is based upon the known principle, whereby the spectrum of the standard pulse signal is transferred to the high-frequency range by multiplying this signal by a harmonic oscillation.

Let it be assumed that in equation (1) the respective transfer functions of the number-to-voltage converters 101 and 104 are as follows:

$$U_3(t) = B_k \quad (2)$$

$$U_4(t) = \cos \omega_k(t) \quad (3),$$

where $B_k$ is the amplitude of the k-th harmonic of the harmonic signal;

$k = 1, 2, \ldots, r$; and $\omega_k$ is the frequency at which the standard pulse signal is filled with harmonic oscillations.

$U_4(t)$ according to (3) is formed to a desired accuracy with the aid of the digital functional converter 96 which ensures the conversion of the linearly changing input code sequence, formed at the output of the reversible counter 92, to a non-linear code sequence which determines the shape of the signal modulating the envelope of the pulse signal at the output of the digital controlled random actions simulator 10.

With $\omega_k = 1$, the positive half period of the harmonic oscillation /see equation (3)/ is quantized for $\xi$ clock cycles, and the values of $U_4(t_i)$ with $i = 0, 1, 2, \ldots (\xi - 1)$ are represented at the output of the digital functional converter 96 as an n-digit code. By appropriately selecting the values of $\xi$ and n, one can attain any desired accuracy of conversion. $\xi$ determines the digit capacity S of the second reversible counter 92;

$$S \leq \log_2 \xi \quad (4)$$

The negative half period of the harmonic oscillation [see equation (3)] is formed by changing the polarity of the output signal of the digital controlled random actions simulator 10 by a signal from the output of the reversible counter 92 applied to the input 95 of the polarity modulator 42.

From the pulse generator 107, pulses are applied via the frequency divider 108 to the input of the reversible counter 92. The codes arriving from the output of the reversible counter 92 are converted by the digital functional converter 96 to codes which control the output voltage of the fourth number-to-voltage converter 104, whereby the $U_4(t)$ signal is produced. A change in the frequency is effected by setting a desired scaling factor of the second frequency divider 108, which is in accordance with the code formed by the random numbers transducer 24.

The multitude of the amplitudes $B_k$ and frequencies $\omega_k$ is calculated from the predetermined spectral power density of the simulating random pulse process and the known spectral power density of the pulse modulated by the harmonic oscillation. Codes of the amplitudes $B_k$ and frequencies $\omega_k$ are formed by the random numbers transducer 24 with probabilities set according to the desired distribution pattern, and entered in advance in the memory 23.

The codes of the amplitudes $B_k$ and frequencies $\omega_k$ are transmitted from the output of the random numbers transducer 24 to the registers 98 and 111, respectively, which is done by signals arriving from the control unit 25.

Thus in the above operational mode, the output signal of the digital controlled random actions simulator 10 is expressed by the following time function:

$$Q_1(t) = U_1(t)U_2(t)U_5(t)B_k \cos \omega_k \quad (5).$$

The spectral power density of the output process is a superposition of spectral power densities of a pulse of a preselected shape.

The reproduced spectral power density function of the random process approximates the predetermined arbitrary spectral power density function to any desired degree of accuracy. In order to ensure a uniform distribution of the random initial phase of the signal $\cos \omega_k$, the random numbers transducer 24 forms equiprobable random codes which are entered, prior to forming another pulse, in the second reversible counter 92. This is done by a signal applied from the control unit 25 to the input of the reversible counter 92.

Thus the digital controlled random actions simulator 10 forms a random pulse process with a required spectral power density function by modulating pulses with harmonic signals.

The digital controlled random actions simulator 10 (FIG. 4) is intended to produce a random process of a pulsed nature, which is a train of pulse signals of a random or predetermined shape, recurring through random or predetermined time intervals.

The digital controlled random actions simulator 10 operates in two modes. The first mode presupposes an adjustment to predetermined statistical characteristics of random actions, whereby in the memories 145 and 156, the pulse distributor 122 and the registers 116 and 137 there are entered binary codes which determine the statistical characteristics of random actions. The second mode consists of producing random actions.

The first mode is auxiliary and invariably precedes the second mode during which at the output of said digital controlled random actions simulator 10 there is a random pulse process.

The data recording process is carried out as follows. To one of the inputs of the commutator 158, there is applied a sequence of binary codes; there are also applied signals which synchronize the instances of the appearance of said binary codes. From the second output of said commutator 158, the binary codes are applied to the inputs 161 and 162 of the memories 145 and 156 and the inputs $164_1 \ldots 164_8$ of the registers $116_1, \ldots, 116_8$; the pulses which synchronize the instances of appearance of the binary codes are applied from the first output of said commutator 158 to the input 159 of the pulse counter 157. The binary code, entered in the counter 157, determines the record address of the binary code. The record address of the binary code is applied to the address inputs 165 and 166 of the memories 145 and 156. In order to enter the binary codes in the registers $116_1, \ldots, 116_8$, the record address code is decoded by the decoder 155, at whose outputs there are produced write signals. The data recording process is carried out in a certain order. First, information is entered in the memories 145 and 156, then in the pulse distributor 122 and, finally, in the registers 116 and 137. To the input 163 of the distributor 122 (FIG. 7) two binary codes are successively applied; the first code is entered in the flip-flop 217 by a signal at the input 169, whereas the second code is entered in the register 215 by a signal at the input 170. In the registers $116_1, \ldots, 116_8$ (FIG. 4), information is entered from the inputs $164_1, \ldots, 164_8$ by signals at the inputs $174_1, \ldots, 174_8$. In the register 137, information is entered from the input 160 by a signal at the input 171; this ends the data loading process.

The generation of a random pulse process includes the performance of four operating cycles by different units of the simulator 10, namely, a cycle of producing a random time interval, a pulse forming cylce, a cylce of generating an actual pulse signal value, and a multiplication cycle. The cycle of forming a random time interval and the pulse forming cycle alternate with time. The cycles of forming an actual pulse signal value are performed only within the pulse forming cycle. The multiplication cycles are performed within the cycle of forming an actual pulse signal value.

Consider the process of generating a random pulse process beginning with an instant of time when the formation of a pulse signal is over. This instant is the beginning of forming a random time interval and is marked by the appearance of an "end of pulse" signal at the output of the pulse distributor 122. At this stage, the flip-flop 222 (FIG. 7) of the pulse distributor 122 and the flip-flop 190 (FIG. 6) of the potential distributor 118 are in the off state. From the output of the distributor 122 (FIG. 4), the "end of pulse" signal is applied to the respective input of the register 175. As a result, this register is reset, which state determines the presence of zero voltage across the output of the number-to-voltage converter 176. The "end of pulse" signal is also applied to the input 151 of the pulse counter 147, whereby this counter is reset, and to the input 150 of the random numbers transducer 146, which sets the instant of producing a random number. The random number is produced according to the distribution pattern determined by the binary codes stored in the memory 145. To the input 148 of the memory 145, there are applied binary codes which set addresses of information being stored. To the input 149 of the random numbers transducer 146 there is applied the stored information. Upon the end of producing a random number, to the input 152 of the pulse counter 147 there is applied a respective binary code, which code is stored by said counter 147. The pulse counter 147 operates in the countdown mode, so signals of the second clock sequence, applied from the output of the frequency divider 136 to the input 153 of the pulse counter 147, successively and over predetermined time intervals reduce the contents of said pulse counter 147 by unity until the counter 147 is at zero. At this instant, the cycle of forming a random time interval is ended, and at the output of the pulse counter 147 there appears an "onset of pulse" signal which sets the beginning of a pulse formation cycle. The frequency division factor of the divider 136 is determined by the contents of the high-order group of digits of the register 137, so a variation in this state leads to a change in the scale of the conversion of the random number to a time interval. Besides, the scale of the conversion is also determined by the repetition frequency of pulses of the reference pulse train applied to the input 139 of the divider 136 from the output of the pulse generator 134.

In the general case, the time interval T between the appearance of the "end of pulse" signal and the instant the "onset of pulse" signal is formed is derived from the following equation:

$$T = M(N+1)\Delta t \qquad (6),$$

where
  M is the value of the random number;
  N is the code stored by the high-order group of digits of the register 137; and
  $\Delta t$ is the interval between pulses of the reference train of pulses.

Figure 9:
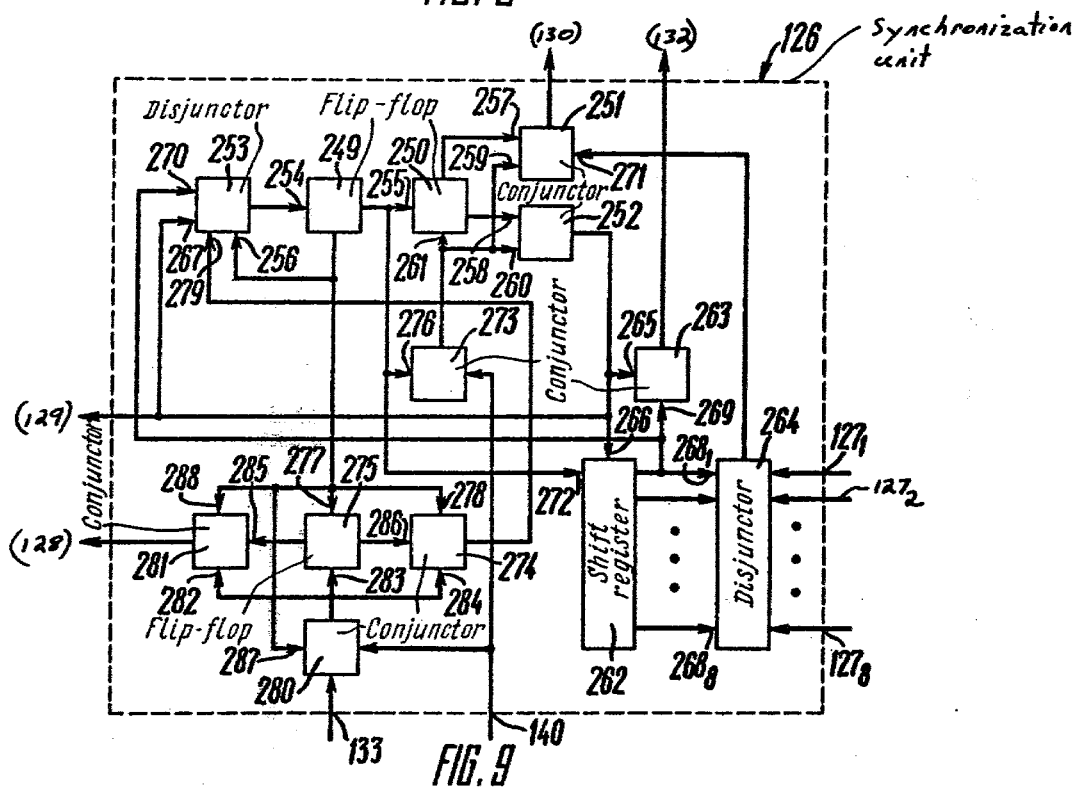
FIG. 9 is a block diagram of a synchronization unit in accordance with the invention.

Consider a cycle of generating a pulse whose onset is the "onset of pulse" signal applied from the output of the pulse counter 147 to the input 154 of the pulse distributor 122. The appearance of the "onset of pulse" signal is preceded by the next state of the pulse distributor 122 and the potential distributor 118. The flip-flop 222 (FIG. 7) of the pulse distributor 122 is in its off state; at the input 226 of the conjunctor 223 there is an enabling signal; at the input 234 of the conjunctor 210 there is an inhibiting signal which is applied to the input 235 of the counter 212 to reset it. There are no signals at the respective outputs of the decoder 211, since there is no passage of signals via the conjunctor 210 to the gating input 213 of the decoder 211. A signal from the respective output of the pulse distributor 122 is applied to the input 124' of the potential distributor 118 (FIG. 6) and inhibits the passage of signals from the input 144 via the conjunctor 192. The flip-flop 190 of the potential distributor 118 is in the off state, which means that at the input 206 of the conjunctor 192 there is an enabling signal; at the input 207 of the shift register 189 there is a reset signal, which corresponds to the presence of a signal at only one of its outputs, corresponding to the lowest-order digit of said register; at the input 205 of the pulse counter 201 there is a reset signal; at the input 203 of the conjunctor 193 there is an inhibiting signal which is also applied to the input 133 (FIG. 4) of the synchronization unit 126 and, through a respective input, inhibits the passage of signals via the conjunctor 280 (FIG. 9).

Figure 4:
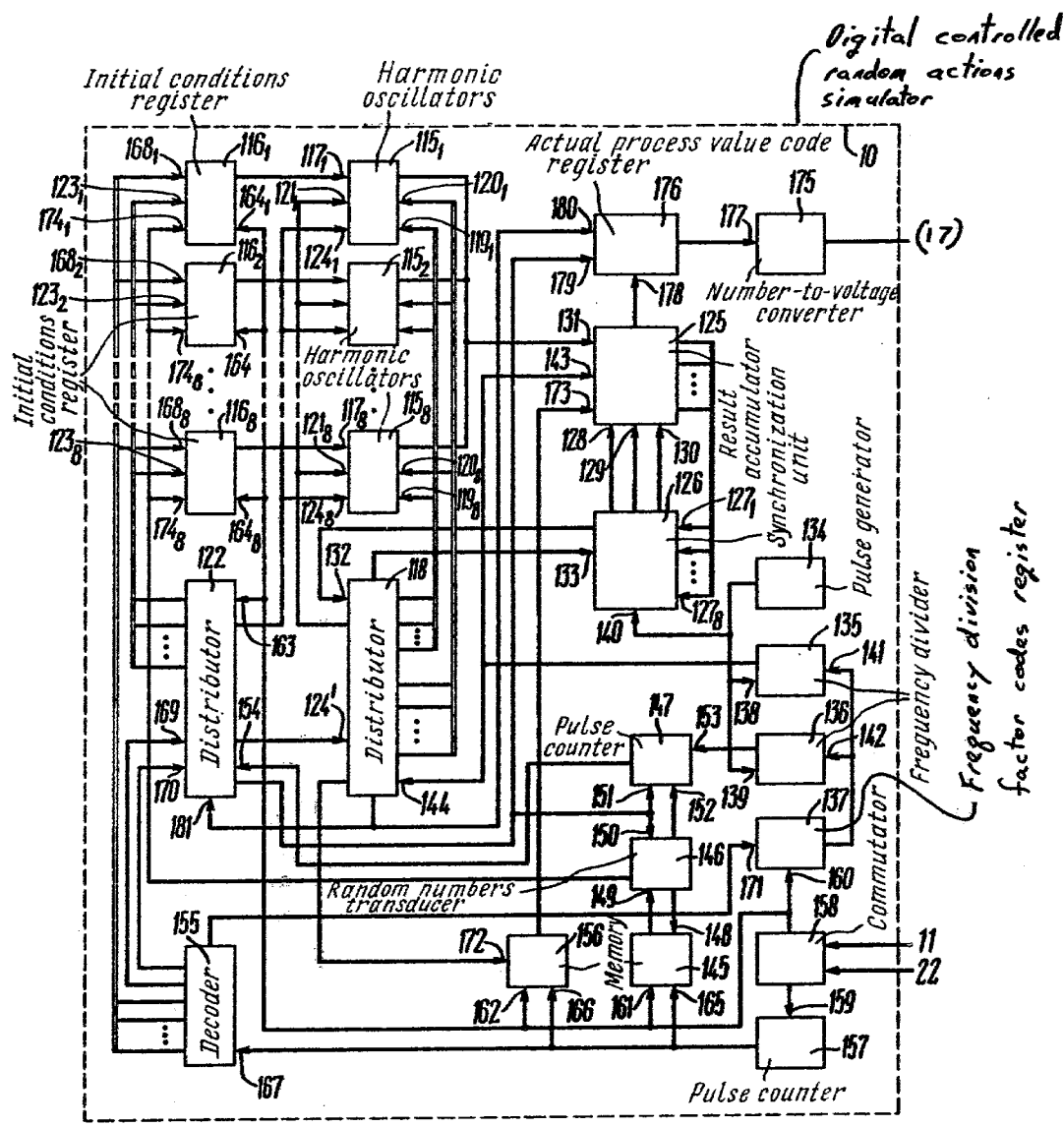
FIG. 4 is a block diagram of an alternative embodiment of the digital controlled random actions simulator in accordance with the invention.
Figure 5:
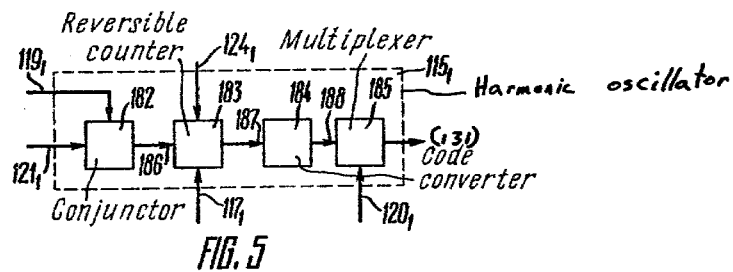
FIG. 5 is a block diagram of a harmonic oscillator in accordance with the invention.

The appearance of the "onset of pulse" signal at the input 154 (FIG. 4) of the pulse distributor 122 results in an appearance of an "initial conditions setting" signal at the respective output of the pulse distributor 122, which signal is applied to the inputs $123_1, \ldots, 123_8$, whereby the binary codes are transferred from the initial conditions registers $116_1, \ldots, 116_8$ via the inputs $117_1, \ldots, 117_8$ to the respective harmonic oscillators $115_1, \ldots, 115_8$; this means that the "initial conditions setting" signal is applied to a respective code write input of the reversible counter 183 (FIG. 5). Besides, the flip-flop 222 (FIG. 7) is switched on, whereby the passage of signals via the conjunctor 223 is inhibited, whereas signals are enabled to pass through the input 234 via the conjunctor 210, and the reset signal is removed from the pulse counter 212; the appearance of a signal at the respective output of the pulse distributor 122 enables the potential distributor 118 (FIG. 6) to operate in the cyclic mode, i.e. at this instant there begins the process of cyclic generation of pulse signal current values; the end of a cycle is marked by the appearance of an "end of cycle" signal at the respective output of the potential distributor 118, which signal is applied to the input 181 (FIG. 7) of the pulse distributor 122 and increases the contents of the counter 212 by unity. The pulse generating cycle is ended when the state of the counter 212 coincides with that of the register 215, whereby at the output of the comparison circuit 216 there is produced a signal to enable the passage of the "end of cycle" signal via the conjunctor 224 and disjunctor 225; the flip-flop 222 is brought to the off state, and there appears an "end of pulse" signal at the respective output of the pulse distributor 122.

In the course of the pulse generating cycle, the pulse counter 212 counts the number of completed cycles of generating current pulse signal values, whose maximum number is set by the binary code stored by the register 215. Thus by changing the value of the code stored by the register 215, one can set the desired duration of the pulse $\tau$, which is derived from the following equation:

$$\tau = k \Delta t_2 \qquad (7),$$

where
  k is the binary code stored by the register 215; and
  $\Delta t_2$ is the duration of the cycle of generating current pulse signal values.

The appearance of signals at the respective outputs of the pulse distributor 122 is determined by the state of the flip-flop 217; if the flip-flop 217 is in the "on" state, the signal applied from its output to the input 218 of the conjunctor 210 enables the passage of the "end of cycle" signal from the input 234 to the output of said conjunctor 210 and on from the input 213 of the decoder 211 to a respective output. The number of this output, at which the "end of cycle" signal is produced, is set by the variable code of the counter 212 whose output is connected to the input 214 of the decoder 211.

Accordingly, when the flip-flop 217 is in the "on" state, the "end of cycle" signal successively appears at the respective outputs of the pulse distributor 122, which are connected to the inputs 123 (FIG. 4) of the respective initial conditions registers $116_1, \ldots, 116_8$, and controls the writing into said registers, through the inputs 174, of random numbers arriving from the output of the random numbers transducer 146. When the flip-flop 217 is in the "off" state, no signals are applied to the respective outputs of the pulse distributor 122, whereas the initial conditions registers $116_1, \ldots, 116_8$ (FIG. 4) continue to store the original codes.

The pulse generating cycle is followed by the random time interval generating cycle, and this sequence of cycles is repeated throughout the entire course of the random pulse process. The cycles of generating actual current pulse values can only take place within the pulse generation cycle, when the flip-flop 222 (FIG. 7) is in the on state, so that there is an enabling signal at the input 124, (FIG. 6) of the potential distributor 118 and, accordingly, at the input of the conjunctor 192. The beginning of the cycle of generating the actual pulse signal value is set by the "onset of cycle" signal applied from the output of the frequency divider 135 (FIG. 4) to the input 144 (FIG. 6) of the distributor 118.

The flip-flop 190 is in the "off" state; the "onset of cycle" signal passes via the conjunctor 192 and disjunctor 194 and switches the flip-flop 190 on; as this takes place, from the input 207 of the shift register 189 and the input 205 of the pulse counter 202 there is removed a set signal; at the same time from the input 206 of the conjunctor 192 there is removed a signal which enables the passage of signals to the output of said conjunctor 192. Besides, as the flip-flop 190 is brought to the on state, at the respective output of the potential distributor 118 there is produced a signal to perform multiplication cycles and enable the passage of signals through the conjunctor 193. The synchronization unit 126 (FIG. 4) starts to perform multiplication cycles, the end of each cycle being accompanied by an "end of multiplication" signal applied from the respective output of the synchronization unit 126 to the input 132 (FIG. 6) of the potential distributor 118. The flip-flop 193 is on, so from the respective input of the conjunctor 193, the "end of multiplication" signals are passed to its output and applied to the input 202 of the counter 201, the shift input 195 of the shift register 189, and the respective output of the potential distributor 118. Thus each multiplication cycle increases the contents of the counter 202 by unity and shifts the information stored by the register 189. The shifting of information storage locations in the register 189 is effected so that with a shift of unity from a lower to a higher order digit, unity is also written in the lower order digit.

Figure 6:
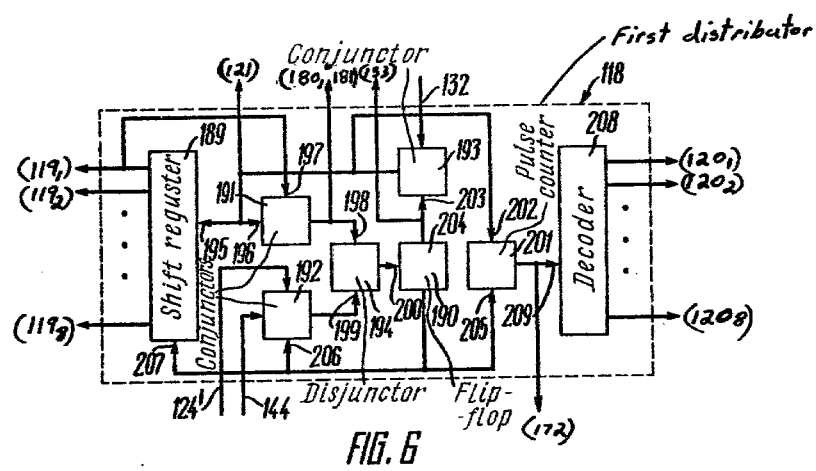
FIG. 6 is a block diagram of the first distributor in accordance with the invention.

The cycle of producing the actual pulse signal value is ended upon the appearance of a signal at the higher order location of the shift register 189 (FIG. 6), as well as the appearance at the respective output of the synchronization unit 126 (FIG. 4) of an "end of multiplication" signal which is applied to the input 132 of the potential distributor 118 and is further applied via the conjunctors 193 and 191 and the disjunctor 194 to the flip-flop 190, whereby the flip-flop is brought to the off state. As this takes place, at the respective output of the potential distributor 118 (FIG. 4) there appears an "end of cycle" signal which is applied to the input 180 of the register 176, whereby from the result accumulator 125 to said register 176 there is transferred a binary code corresponding to the actual value of the random process. In the course of generating the actual pulse signal value, to the input 120 (FIG. 5) of the harmonic oscillators 115 there are successively applied potentials arriving from the respective outputs of the potential distributor 118, which potentials enable the passage of signals from the output of the code converter 184 (FIG. 5) to the outputs of the harmonic oscillators 115. The code at the outputs of the decoder 208 (FIG. 6) is changed upon the arrival of the "end of multiplication" signal, so during each new multiplication cycle the next harmonic oscillator is connected to the input 131 of the result accumulator 125 (FIG. 4). Thus during the cycle of generating the actual pulse signal value, to the input 131 of the result accumulator 125 there are successively connected all the harmonic oscillators $115_1, \ldots 115_8$. Besides, in the course of the cycle of generating the actual pulse signal value, the "end of multiplication" signal, applied from the synchronization unit 126 to the input 132 of the potential distributor 118, passes via the conjunctor 193 (FIG. 6), is applied to the respective output of the potential distributor 118 and on to the combined inputs 121 (FIG. 4) of the harmonic oscillators $115_1, \ldots, 115_8$, which are connected to one of the inputs of the conjunctor 182 (FIG. 5). The other inputs of said conjunctor 182 are the inputs 119 of the harmonic oscillators, connected to the respective outputs of the potential distributor 118 (FIG. 4), so the passage of signals via the conjunctor 182 (FIG. 5) to the input 186 of the reversible counter 183 and the number of these signals occurring during the cycle of generating the actual pulse signal value are dependent upon the digit location number of the register 189 (FIG. 6), to which the respective harmonic oscillator is connected. During the cycle of generating the actual pulse signal value, through the conjunctor 182 (FIG. 5) to the input 186 of the reversible counter 183 there successively pass 1, 2, 3, . . . , 8 signals; to the lesser number corresponds the harmonic oscillator connected to the higher-order digit location of the shift register 189 (FIG. 6).

By each signal arriving at its input 186, the code state of the reversible counter 183 (FIG. 5) is changed by a unity; following the arrival of a plurality of input signals, there is brought about a linear change with time in the state of said reversible counter 183. From the output of the reversible counter 183, the linearly changing sequence of binary codes is applied to the input 187 of the code converter 184, at whose output there is a respective sequence of binary codes which changes linearly with time. Thus during the pulse generation cycle, at the outputs of the harmonic oscillators $115_1, \ldots, 115_8$ there are harmonically changing code sequencies with multiple frequencies.

Consider now the manner in which the multiplication cycle is performed by the synchronization unit 126 (FIG. 4) and the result accumulator 125. The multiplication cycle is found within the cycle of generating the actual pulse signal value in the presence of an enabling signal at the input 133 of the synchronization unit 126. The multiplication cycle is preceded by the appearance of a signal applied from the output of the frequency divider 135 to the input 143 of the result accumulator 125, whereby the register 238 (FIG. 8) is reset. At this stage, the flip-flop 249 (FIG. 9) of the synchronization unit 126 is in the on state, so that there is an enabling signal at the input 256 of the disjunctor 253, the input 278 of the conjunctor 274, the input 277 of the flip-flop 275, and the input 288 of the conjunctor 281. Upon the appearance of an enabling signal at the input 133 of the synchronization unit 126, signals of the pulse generator 134 (FIG. 4) pass via the conjunctor 280 (FIG. 9) and the conjunctor 281, due to the presence of an enabling signal at the input 285 of the conjunctor 281; these signals are applied to the input 128 (FIG. 8) of the result accumulator 125, whereby information is entered in the register 236 and the flip-flop 242; the information is also applied to the input 131 of the result accumulator 125; also, information is entered in the register 248 and the flip-flop 243 and is applied to the input 173 of the result accumulator 125. Said information write signal is applied to the combined inputs of the respective registers and flip-flops. Upon the end of said signal at the output of the conjunctor 280 (FIG. 9), the state of the flip-flop 275 is changed, and the next signal is passed from the input 140 of the synchronization unit 126 via the conjunctor 280, the conjunctor 274, and the disjunctor 253, whereby the state of the flip-flop 249 is changed; an inhibiting signal is produced at the input 287 of the conjunctor 280. The change of the state of the flip-flop 249 produces an enabling signal at the input 276 of the conjunctor 273, whereas with the flip-flop 249 being in its previous state, the state of the flip-flop 250 corresponds to the presence of an enabling signal at the input 257 of the conjunctor 251; through the input 272, in the register 262 there is entered a zero binary code with the exception of the lowest-order digit. The next signal, arriving at the input 140 of the synchronization unit 126, is passed via the conjunctor 273, and the conjunctor 251, provided there is an enabling signal at its input 271, and is applied to the input 130 (FIG. 8) of the result accumulator 125, which input 130 is connected to the respective write input of the register 238. Upon the end of this signal, in the register 238 there is entered a binary code arriving from the output of the arithmetic logical unit 237 at the input 24° of the register 238, whereby the state of the flip-flop 250 (FIG. 9) is changed.

The binary code at the output of the arithmetic logical unit 237 (FIG. 8) is formed according to the states of the flip-flops 242 and 243, which correspond to the sign digits of the binary codes stored in the registers 236 and 238, respectively. The outputs of said flip-flops are connected to the input of the modulo two adding circuit 244; if the states of the flip-flops 242 and 243 coincide, there is a signal at the output of said circuit 244; there is no signal if the states of said flip-flops 242 and 243 differ. Thus in the presence of a signal at the input 247 of the arithmetic logical unit 237, at its output there is formed a code equal to the sum total of the codes arriving at the inputs 239 and 241 of said unit 237. In the absence of a signal at the output 247 of the arithmetic logical unit 237, at its output there is formed a code equal to the difference between the binary codes arriving at its inputs 239 and 241. Upon the arrival of the next signal at the input 140 of the synchronization unit 126 (FIG. 9), said signal is passed via the conjunctors 273 and 252 and applied to the input 266 of the shift register 262, whereby the binary code stored in said register 262 is shifted one digit towards the higher-order digits. Upon the end of this signal, the flip-flop 250 reassumes its previous state.

The states of the flip-flop 250 are changed, and information is shifted in the register 262 as described above until the appearance of an enabling signal at the highest-order digit location of the register 262. This signal is applied to the input 270 of the disjunctor 253, so upon the arrival of the next signal from the output of the conjunctor 252, it is applied to the input 254 of the flip-flop 249, whereby the state of the flip-flop is reversed. This ends the multiplication, as indicated by the appearance of a signal at the output of the conjunctor 263 and the respective output of the synchronization unit 126.

According to the foregoing sequence of operational cycles of the simulator 10 (FIG. 4), at its output there is formed a random process which is a train of pulse signals, each having a random or predetermined shape and recurring over both random and predetermined time intervals; the statistical characteristics of the random pulse process are determined by the arrays of binary codes stored in the memories and registers of the simulator.

The structure and composition of the proposed system and the proposed testing method guarantee effective testing of different objects for random actions. The system of the present invention is a closed system providing for automatic control of its units by instructions issued by a digital computer. These factors and the presence of a special unit, i.e. the digital controlled random actions simulator, provide for maximum compatibility of the testing conditions with the actual operating conditions and make it possible to produce extrme testing conditions with a view to studying the behaviour of objects being tested.

What is claimed is:

1. A method of testing objects for random action, comprising the steps of:
    recording said random actions, to which said object is subjected in the course of operation;
    determining the spectral composition and statistical characteristics of said recorded random actions, to which said object is subjected;
    reproducing said random actions as a simulating random pulse process, wherein the amplitudes, durations and polarities of pulses, as well as intervals between pulses, are random parameters with predetermined probability characteristics approximate to said recorded actions as regards their spectral and statistical characteristics;
    selecting a combination of pulse shapes;
    forming said simulating random pulse process as a train of pulses of different shapes from the preselected combination of pulse shapes;
    forming statistically independent random parameters of said pulses;
    applying said reproduced random actions to said object;
    analyzing said spectral and statistical characteristics of said reproduced random actions and the response of said objects to these actions to obtain data for calculating the parameters for correcting the spectral and statistical characteristics of the simulating random pulse process; and
    correcting said spectral and statistical characteristics of the simulating random pulse process by varying its probability characteristics.

2. A method as claimed in claim 1, further comprising the steps of
    selecting a harmonic signal possessing a random and statistically independent amplitude, phase and frequency; and
    modulating said pulses of said simulating random pulse process by said harmonic signal possessing said random and statistically independent amplitude, phase and frequency.

3. A method as claimed in claim 2, further comprising the steps of
    selecting a combination of harmonic signals possessing random and statistically independent amplitudes, phases and frequencies;
    converting said combination of harmonic signals possessing random and statistically independent amplitudes, phases and frequencies to codes which control the output; and
    modulating said pulses of said simulating random pulse process by said converted combination of harmonic signals possessing random and statistically independent amplitudes, phases and frequencies.

4. A method as claimed in claim 1, further comprising the steps of
    selecting a combination of harmonic signals possessing random and statistically independent amplitudes, phases and frequencies;
    converting said combination of harmonic signals possessing random and statistically independent amplitudes, phases and frequencies to codes which control the output; and modulating said pulses of said simulating random pulse process by said converted combination of harmonic signals possessing random and statistically independent amplitudes, phases and frequencies.

5. A digital simulator-computer system for testing objects for random actions, comprising:
a control computer forming deterministic test signals;
a main forward channel comprising at least one digital-to-analog converter having an input and an output;
a main feedback channel comprising at least one analog-to-digital converter having an input and an output;
an auxiliary forward channel comprising at least one digital controlled random actions simulator reproducing random actions upon the object as a simulating random pulse process, said simulator having first and second inputs and an output;
an auxiliary feedback channel comprising at least one digital multifunctional statistical analyzer statistically analyzing reproduced random actions during the course of testing objects, said analyzer having an input and first and second outputs, said second output being connected to said second input of said simulator;
a first distribution device having first and second inputs connected to said outputs of said digital-to-analog converter and said simulator, respectively, and an output;
a second distribution device having an input and first and second outputs connected to said inputs of said analyzer and said analog-to-digital converter, respectively;
an interface unit conjugating said control computer with said main and auxiliary forward and feedback channels and having first, second and third inputs and first, second and third outputs, said first input and said first output of said interface unit being connected to an output and an input of said control computer, respectively, the second input of said interface unit being connected to said output of said analog-to-digital converter, the second output of said interface unit being connected to said input of said digital-to-analog converter, the third output of said interface unit being connected to said first input of said simulator, and the third input of said interface unit being connected to said first output of said analyzer; and
a test bed transmitting test actions to the object and being connected to said main and auxiliary forward channels, via said output of said first distribution device, and to said main and auxiliary feedback channels, via said input of said second distribution device.

6. A digital simulator-computer system as claimed in claim 5, wherein the digital controlled random actions simulator comprises:
a first memory storing codes which determine the type and numerical characteristics of distribution functions of random parameters of pulses of the simulating random pulse process and having first, second, third and fourth inputs and first and second outputs, said third and fourth inputs being connected to said inputs of said simulator;
a random numbers transducer forming codes of random numbers corresponding to specific values of amplitudes, durations and polarities of pulses and durations of intervals between adjacent pulses, said transducer having first and second inputs and first, second and third outputs, said first input and said first output of said random numbers transducer being connected to said first output and said first input of said first memory; a control unit having first, second and third inputs and first, second, third, fourth, fifth and sixth outputs, said first input and said first output of said control unit being connected to said second output and said second input of said first memory, respectively, said second input and said second output being connected to said second output and said second input of said random numbers transducer, respectively;
a pulse counter storing a random code determining the duration of the time interval between pulse signals of the simulating random pulse process and converting that code to a time interval, said pulse counter having first, second and third inputs and an output, said third input of said pulse counter being connected to said third output of said random numbers transducer, said first input and said output being connected to said third output and said third input of said control unit, respectively;
a generator of variable recurrence frequency pulses generating a flow of clock pulses to fill said pulse counter and set the frequency of the output flow of pulse signals at the output of said digital controlled random actions simulator, an output of said pulse generator being connected to said second input of said pulse counter;
a reference voltage source setting an amplitude distribution range of pulse signals formed by the digital controlled random actions simulator and having an output;
a first number-to-voltage converter converting the code, which determines the amplitude of pulse signals, to a voltage corresponding to that amplitude and distributed within the amplitude distribution range, said first number-to-voltage converter having a first input, a second input and an output, said first input of said number-to-voltage converter being electrically coupled to said output of said reference voltage source;
a second number-to-voltage converter, for voltage conversion of codes whose sequence determines the shape of pulse signals formed by said digital controlled random actions simulator, having a first input, a second input and an output, said first input being connected to said output of said first number-to-voltage converter;
a polarity modulator ensuring a prescribed probability of producing positive and negative pulses and having first, second, third and fourth inputs and an output, said first input being connected to said output of said second number-to-voltage converter, said second input of said polarity modulator being connected to said output of said reference voltage source, said output of said polarity modulator being connected to said output of said simulator;
a first register storing a code which determines the amplitude and polarity of the next pulse of the simulating random pulse process and having first and second inputs and first and second outputs, said first output of said first register being connected to said second input of said first number-to-voltage converter, said second output of said first register being connected to said third input of said polarity modulator, said first input of said first register being connected to said third output of said random numbers transducer, and said second input of said first register being connected to said fourth output of said control unit;

a reversible counter forming a linearly rising and dropping code sequence, whereby an isosceles triangle-shaped pulse is produced, and having first, second and third inputs and first, second and third outputs, said first output of said reversible counter being connected to said fourth input of said control unit, and said first input of said reversible counter being connected to said fifth output of said control unit;

a second pulse generator generating a flow of clock pulses, whose frequency is equal to a maximum frequency at which said reversible counter is filled, and having an output;

a frequency divider setting the rate of filling said reversible counter with clock pulses and having first and second inputs and an output, said second input being connected to said output of said second pulse generator, and said output being connected to said second input of said reversible counter;

a second register storing a code corresponding to the duration of the base of the isosceles triangle-shaped pulse and determining the repetition frequency of clock pulses filling said reversible counter, said second register having first and second inputs and an output, said output of said second register being connected to said first input of said frequency divider, said first input of said second register being connected to said third output of said random numbers transducer, and said second input of said second register being connected to said sixth output of said control unit;

a cyclic shift register storing a code, which determines the sequence of changing the polarity sign of the group of pulses at the output of said digital controlled random actions simulator, and having first and second inputs and an output;

a cycle length control unit setting the number of pulses in the group of successive pulses at said output of said digital controlled random actions simulator and having an input and first, second and third outputs, said input and said third output of said cycle length control unit being connected to said third output and said third input of said reversible counter, respectively, said first and said second outputs of said cycle length control unit being connected to said first and second inputs of said cyclic shift register, respectively;

a first flip-flop having first and second outputs;

first and second conjunctors, each having first and second inputs and an output, said second input of said first conjunctor being connected to said first output of said first flip-flop, said first input of said second conjunctor being connected to said second output of said first flip-flop, said second input of said second conjunctor being connected to said output of said cyclic shift register;

a first disjunctor having first and second inputs and an output, said first flip-flop, first and second conjunctors and first disjunctor ensuring separate transmission of codes from said output of said cyclic shift register to said polarity modulator, said output of said first conjunctor being connected to said first input of said first disjunctor, said output of said first disjunctor being connected to said fourth input of said polarity modulator, said output of said second conjunctor being connected to said second input of said first disjunctor;

a second memory storing ordinates codes of a pulse of a predetermined shape and having an input and first and second outputs, said input of said second memory being connected to said second output of said reversible counter, and said second output of said second memory being connected to said first input of said first conjunctor;

a second flip-flop having first and second outputs;

third and fourth conjunctor units, each having first and second inputs and an output, said first input of said third conjunctor unit being connected to said second output of said reversible counter, said second input of said third conjunctor unit being connected to said first output of said second flip-flop, said first input of said fourth conjunctor unit being connected to said first output of said second memory, said second input of said fourth conjunctor unit being connected to said second output of said second flip-flop; and a second disjunctor unit having first and second inputs and an output, said second flip-flop, third and fourth conjunctor units and second disjunctor unit ensuring separate transmission of codes from said outputs of said reversible counter and said second memory to said second input of said second number-to-voltage converter, said output of said third conjunctor unit being connected to the first input of said second disjunctor unit, said output of said second disjunctor unit being connected to said second input of said second number-to-voltage converter, and said output of said fourth conjunctor unit being connected to said second input of said second disjunctor unit.

7. A system as claimed in claim 6, wherein the digital controlled random actions simulator further comprises:

a second reversible counter forming a linearly changing code sequence and having first, second and third inputs and first and second outputs, said first input of said second reversible counter being connected to said third output of said random numbers transducer, said second input of said second reversible counter being connected to a seventh output of said control unit, and said first output of said second reversible counter being connected to a fifth input of said polarity modulator;

a digital functional converter converting the linearly changing code sequence to a non-linear code sequence, which sets the shape of a signal modulating the envelope of the pulse signal formed by said digital controlled random actions simulator, having an input and an output, said input of said digital functional converter being connected to said second output of said second reversible counter;

a third register setting the amplitude of the modulating signal and having first and second inputs and an output, said first input of said third register being connected to said third output of said random numbers transducer, and said second input of said third register being connected to an eighth output of said control unit;

a third number-to-voltage converter having first and second inputs and an output, said first input of said third number-to-voltage converter being connected to said output of said reference voltage source, said second input of said third number-to-voltage converter being connected to said output of said third register;

a fourth number-to-voltage converter having first and second inputs and an output, said first input of said fourth number-to-voltage converter being connected to said output of said third number-to-voltage converter, said second input of said fourth number-to-voltage converter being connected to said output of said digital functional converter, and said output of said fourth number-to-voltage converter being connected to said first input of said first number-to-voltage converter;

a third pulse generator generating clock pulses, whose frequency is equal to a maximum frequency at which said second reversible counter is filled, having an output;

a second frequency divider setting the rate of filling said second reversible counter with clock pulses, said second frequency divider having a first input connected to said output of said third pulse generator, a second input, and an output connected to said third input of said second reversible counter; and a fourth register storing a code, which determines the frequency at which the second reversible counter is filled with clock pulses, and having first and second inputs and an output, said first input of said fourth register being connected to said third output of said random numbers transducer, said second input of said fourth register being connected to a ninth output of said control unit, and said output of said fourth register being connected to said second input of said frequency divider.

8. A system as claimed in claim 5, wherein the digital controlled random actions simulator comprises:

a plurality of harmonic oscillators setting a desired Fourier spectrum of pulses of the simulating random pulse process, each harmonic oscillator having first, second, third, fourth and fifth inputs and an output, said output of each of said harmonic oscillators being combined;

a plurality of initial conditions registers storing predetermined initial phases of harmonic oscillations, each of said initial conditions registers having first, second, third and fourth inputs and an output, said output of each of said initial conditions registers being connected to said first input of a respective harmonic oscillator;

a first distributor setting the frequencies of harmonic oscillations at the outputs of said harmonic oscillators and having first, second and third inputs, first, second, third and fourth outputs and first and second groups of outputs, outputs of said first group of outputs being connected to said second input of a respective harmonic osciallator, outputs of said second group of outputs being connected to said third input of respective harmonic oscillators, and said first output being connected to said fourth input of each of said harmonic oscillators;

a second distributor entering in said initial conditions registers codes, which determine the initial phases of harmonic oscillations, and having first, second, third, fourth and fifth inputs, first, second and third outputs and a group of outputs, outputs of said group of outputs being connected to said first input of a respective initial conditions register, said first output being connected to said fifth input of each of said harmonic oscillators, said second output being connected to said first input of said first distributor, and said fifth input being connected to said fourth output of said first distributor;

a result accumulator for non-linear conversion of harmonic oscillations having first, second, third, fourth, fifth and sixth inputs, an output and a group of outputs, said fourth input being connected to said output of each of said harmonic oscillators;

a synchronization unit having first and second inputs, a group of inputs, and first, second, third and fourth outputs, inputs of said group of inputs being connected to a respective output of said group of outputs of said result accumulator, said first, second and third outputs of said synchronization unit being connected to said first, second and third inputs of said result accumulator, respectively, said fourth output of said synchronization unit being connected to said second input of said first distributor, and said first input of said synchronization unit being connected to said second output of said first distributor;

a pulse generator forming a first train of clock pulses from a train of reference pulses, the frequency of said first train of clock pulses determining the duration of a pulse at said output of said digital controlled random actions simulator, an output of said pulse generator being connected to said second input of said synchronization unit;

a first frequency divider forming a second train of clock pulses from a train of reference pulses and having first and second inputs and an output, said first input being connected to said output of said pulse generator, and said output being connected to said third input of said first distributor and to said fifth input of said result accumulator;

a second frequency divider forming a third train of clock pulses from the train of reference pulses, said third train of clock pulses determining the area of random values of time intervals between the onsets of adjacent pulses at said output of said digital controlled random actions simulator, said second frequency divider having first and second inputs and an output, said output of said pulse generator being connected to said first input of said second frequency divider;

a frequency division factor codes register having first and second inputs and an output, said output being connected to said second inputs of said frequency dividers;

a first memory storing codes, which determine the distribution pattern of random values of the time interval between the onsets of adjacent pulses at the output of said digital random actions simulator and having first, second and third inputs and an output;

a random numbers transducer producing random codes with a predetermined distribution function and having first and second inputs and first, second and third outputs, said first output and said first input of said random numbers transducer being connected to said first input and said first output, respectively, of said first memory, said second input being connected to said third output of said second distributor, and said third output being connected to said fourth input of each of said initial conditions registers;

a first pulse counter converting the random code to a time interval and having first, second and third inputs and an output, said first input of said first pulse counter being connected to said third output of said second distributor, said second input of said first pulse counter being connected to said second output of said random numbers transducer, said third input of said first pulse counter being connected to said output of said second frequency divider, and said output of said first pulse counter being connected to said first input of said second distributor;

a decoder entering additional codes in said initial conditions registers and having an input, first, second and third outputs and a group of outputs, said first and second outputs being connected to said third and fourth inputs of said second distributor, respectively, said third output being connected to said second input of said frequency division factor codes register, and outputs of said group of outputs being connected to said third input of a respective initial conditions register;

a second memory storing codes, which determine the spectral power density of the random pulse process at said output of said digital controlled random actions simulator, and having first, second and third inputs and an output, said third input being connected to said third output of said first distributor, and said output being connected to said sixth input of said result accumulator;

a second pulse counter setting cell addresses of said first and second memories to enter information in said cells and having an input and an output connected to said third input of said first memory, said second input of said second memory, and said input of said decoder;

a commutator entering codes in said first and second memories through two independent channels and having first and second inputs and first and second outputs, said first input of said commutator being connected to said first input of said simulator, said second input of said commutator being connected to said second input of said simulator, said first output of said commutator being connected to said input of said second pulse counter, said second output of said commutator being connected to said first input of said frequency division factor codes register, said second input of said first memory, said first input of said second memory, said second input of said second distributor and said second input of each of said initial conditions registers;

a number-to-voltage converter, for analog representation of the simulating random pulse process, having an input and an output, said output being connected to said output of said simulator; and an actual process value code register having first, second and third inputs and an output, said output being connected to said input of said number-to-voltage converter, said first input being connected to said output of said result accumulator, said second input being connected to said third output of said second distributor, and said third input being connected to said fourth output of said first distributor.

9. A system as claimed in claim 8, wherein each of said harmonic oscillators comprises:

a conjunctor, to control said harmonic oscillator, having first and second inputs and an output, said first and second inputs of said conjunctor being connected to said second and fourth inputs of said harmonic oscillator, respectively;

a reversible counter forming a linearly changing code sequence and having first, second and third inputs and an output, said output of said conjunctor being connected to said first input of said reversible counter, said second input of said reversible counter being connected to said first input of said harmonic oscillator, and said third input of said reversible counter being connected to said fifth input of said harmonic oscillator;

a code converter converting the linearly changing code sequence to a sinusoidally changing sequence and having an input connected to said output of said reversible counter, and an output; and a multiplexer combining the outputs of the harmonic oscillators and having first and second inputs and an output, said output of said code converter being connected to said first input of said multiplexer, said second input of said multiplexer being connected to said third input of said harmonic oscillator, and said output of said multiplexer being connected to said output of said harmonic oscillator.

10. A system as claimed in claim 9, wherein said first distributor comprises:

a shift register producing a system of potentials to control the frequencies of said harmonic oscillators and having first and second inputs and a group of outputs, outputs of said group of outputs being connected to a respective output of said first group of outputs of said first distributor;

a flip-flop having a first input, a first output connected to said second output of said first distributor, and a second output connected to said second input of said shift register;

a first conjunctor having a first input connected to said second output of said flip-flop, second and third inputs respectively connected to said first and third inputs of said first distributor, and an output;

a second conjunctor having a first input connected to said first output of said flip-flop, a second input connected to said second input of said first distributor, and an output connected to said first output of said first distributor and to said first input of said shift register;

a third conjunctor having a first input connected to said output of said second conjunctor, a second input connected to one of said outputs of said group of outputs of said shift register, and an output connected to said fourth output of said first distributor;

a disjunctor having first and second inputs respectively connected to said outputs of said third and first conjunctors, and an output connected to said input of said flip-flop;

a pulse counter producing a code setting the number of a harmonic oscillator and having a first input connected to said output of said second conjunctor, a second input connected to said second output of said flip-flop, and an output connected to said third output of said first distributor; and a decoder producing signals to control said multiplexer and having an input connected to said output of said pulse counter, and a group of outputs, outputs of said group of outputs being connected to respective outputs of said second group of outputs of said first distributor.

11. A system as claimed in claim 10, wherein said second distributor comprises:
   a pulse counter having first and second inputs and an output, said first input being connected to said fifth input of said second distributor;
   a first conjunctor having first, second and third inputs and an output, said second input being connected to said fifth input of said second distributor;
   a decoder forming signals for writing information in the initial conditions registers and having first and second inputs and a group of outputs, said first input being connected to said output of said first conjunctor, said second input being connected to said output of said pulse counter, outputs of said group of outputs being connected to respective outputs of said group of outputs of said second distributor;
   a register storing a code, which determines the duration of the pulse of the random pulse process at said output of said digital controlled random actions simulator, and having first and second inputs and an output, said first and second inputs being connected to said second and fourth inputs of said second distributor, respectively;
   a comparison circuit, to record the instant of time corresponding to the end of the pulse of the random pulse process at said output of said digital controlled random actions simulator, having first and second inputs and an output, said first input being connected to said output of said register, and said second input being connected to said output of said pulse counter;
   a first flip-flop having first and second inputs and an output, said output of said flip-flop being connected to said first input of said first conjunctor, said first input of said flip-flop being connected to said second input of said second distributor, said second input of said flip-flop being connected to said third input of said second distributor;
   a second flip-flop having an input and first and second outputs, said second output being connected to said second output of said second distributor, to said second input of said pulse counter, and to said third input of said first conjunctor;
   a second conjunctor having a first input connected to said first input of said second distributor, a second input connected to said first output of said second flip-flop, and an output connected to said first output of said second distributor;
   a third conjunctor having a first input connected to said output of said comparison circuit, a second input connected to said fifth input of said second distributor, and an output connected to said third output of said second distributor; and
   a disjunctor having first and second inputs respectively connected to said outputs of said second and third conjunctors, and an output connected to said input of said second flip-flop.

12. A system as claimed in claim 11, wherein said result accumulator comprises:
   a first register storing codes of actual amplitude values of harmonic oscillations and having first, second and third inputs and an output, said inputs being respectively connected to said fourth, second and first inputs of said result accumulator;
   an arithmetic logical unit, for non-linear conversion of codes of said harmonic oscillators, having first, second and third inputs and an output, said output of said first register being connected to said first input of said arithmetic logical unit;
   a second register storing intermediate results of non-linear conversion and having first, second and third inputs and an output, said output of said arithmetic logical unit being connected to said first input of said second register, said second input of said second register being connected to said fifth input of said result accumulator, said third input of said second register being connected to said third input of said result accumulator, and said output of said second register being connected to said second input of said arithmetic logical unit and to said output of said result accumulator;
   a first flip-flop storing a polarity sign code of harmonic oscillations and having first and second inputs and an output, said first and second inputs of said first flip-flop being respectively connected to said first and fourth inputs of said result accumulator;
   a second flip-flop storing the sign code of the factor by which the harmonic oscillation amplitude is multiplied and having first and second inputs and an output, said first and second inputs of said second flip-flop being respectively connected to said first and sixth inputs of said result accumulator;
   a modulo two adding circuit forming an attribute of an operation performed by the arithmetic logical unit having first and second inputs and an output, said first and second inputs of said modulo two adding circuits being connected to said outputs of said first and second flip-flops, respectively, said output of said modulo two adding circuit being connected to said third input of said arithmetic logical unit; and
   a third register storing the code of the factor by which the harmonic oscillation amplitude is multiplied and having first and second inputs and a group of outputs, said first and second inputs being respectively connected to said first and sixth inputs of said result accumulator, and outputs of said group of outputs of said third register being connected to respective outputs of said group of outputs of said result accumulator.

13. A system as claimed in claim 12, wherein said synchronization unit comprises:
   a first flip-flop having an input and first and second outputs;
   a second flip-flop having a first input connected to said first output of said first flip-flop, a second input, and first and second outputs;
   a first conjunctor forming a first non-overlapping pulse train and having a first input connected to said first output of said second flip-flop, a second input, a third input, and an output connected to said third output of said synchronization unit;
   a second conjunctor forming a second non-overlapping pulse train and having a first input connected to said second output of said second flip-flop, a second input, and an output connected to said second output of said synchronization unit;
   a first disjunctor having a first input connected to said second output of said first flip-flop, a second input connected to said output of said second conjunctor, third and fourth inputs, and an output connected to said input of said first flip-flop;
   a shift register producing a sequence of control potentials and having a first input connected to said output of said second conjunctor, a second input connected to said first output of said flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor; a fourth conjunctor having a first input connected to said first output of said first flip-flop, a second input connected to said second input of said synchronization unit, and an output connected to said second inputs of said first and second conjunctors and of said second flip-flop; a fifth conjunctor having a first input connected to said second output of said first flip-flop, second and third inputs, and an output connected to said fourth input of said first disjunctor; a sixth conjunctor having first and third inputs respectively connected to said second and first inputs of said synchronization unit, a second input connected to said second output of said first flip-flop, and an output connected to said second input of said fifth conjunctor; a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

14. A system as claimed in claim 11, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and third inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

15. A system as claimed in claim 10, wherein said result accumulator comprises:

a first register storing codes of actual amplitude values of harmonic oscillations and having first, second and third inputs and an output, said inputs being respectively connected to said fourth, second and first inputs of said result accumulator;

an arithmetic logical unit, for non-linear conversion of codes of said harmonic oscillators, having first, second and third inputs and an output, said output of said first register being connected to said first input of said arithmetic logical unit;

a second register storing intermediate results of non-linear conversion and having first, second and third inputs and an output, said output of said arithmetic logical unit being connected to said first input of said second register, said second input of said second register being connected to said fifth input of said result accumulator, said third input of said second register being connected to said third input of said result accumulator, and said output of said second register being connected to said second input of said arithmetic logical unit and to said output of said result accumulator;

a first flip-flop storing a polarity sign code of harmonic oscillations and having first and second inputs and an output, said first and second inputs of said first flip-flop being respectively connected to said first and fourth inputs of said result accumulator;

a second flip-flop storing the sign code of the factor by which the harmonic oscillation amplitude is multiplied and having first and second inputs and an output, said first and second inputs of said second flip-flop being respectively connected to said first and sixth inputs of said result accumulator;

a modulo two adding circuit forming an attribute of an operation performed by the arithmetic logical unit having first and second inputs and an output, said first and second inputs of said modulo two adding circuit being connected to said outputs of said first and second flip-flops, respectively, said output of said modulo two adding circuit being connected to said third input of said arithmetic logical unit; and a third register storing the code of the factor by which the harmonic oscillation amplitude is multiplied and having first and second inputs and a group of outputs, said first and second inputs being respectively connected to said first and sixth inputs of said result accumulator, and outputs of said group of outputs of said third register being connected to respective outputs of said group of outputs of said result accumulator.

16. A system as claimed in claim 15, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

17. A system as claimed in claim 10, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective units of said group of inputs of said synchronization unit, and an output connected to said third input of said first conjunctor;

a fourth conjunctor having a first input connected to said first output of said first flip-flop, a second input connected to said second input of said synchronizatio unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

18. A system as claimed in claim 9, wherein said second distributor comprises:

a pulse counter having first and second inputs and an output, said first input being connected to said fifth input of said second distributor;

a first conjunctor having first, second and third inputs and an output, said second input being connected to said fifth input of said second distributor;

a decoder forming signals for writing information in the initial conditins registers and having first and second inputs and a group of outputs, said first input being connected to said output of said first conjunctor, said second input being connected to said output of said pulse counter, outputs of said group of outputs being connected to respective outputs of said group of outputs of said second distributor;

a register storing a code, which determines the duration of the pulse of the random pulse process at said output of said digital controlled random actions simulator, and having first and second inputs and an output, said first and second inputs being connected to said second and fourth inputs of said second distributor, respectively;

a comparison circuit, to record the instant of time corresponding to the end of the pulse of the random pulse process at said output of said digital controlled random actions simulator, having first and second inputs and an output, said first input being connected to said output of said register, and said second input being connected to said output of said pulse counter;

a first flip-flop having first and second inputs and an output, said output of said flip-flop being connected to said first input of said first conjunctor, said first input of said flip-flop being connected to said input of said second distributor, said second input of said flip-flop being connected to said third input of said second distributor;

a second flip-flop having an input and first and second outputs, said second output being connected to said output of said second distributor, to said second input of said pulse counter, and to said third input of said first conjunctor;

a second conjunctor having a first input connected to said first input of said second distributor, a second input connected to said first output of said second flip-flop, and an output connected to said first output of said second distributor;

a third conjunctor having a first input connected to said output of said comparison circuit, a second input connected to said fifth input of said second distributor, and an output connected to said third output of said second distributor; and a disjunctor having first and second inputs respectively connected to said outputs of said second and third conjunctors, and an output connected to said input of said second flip-flop.

19. A system as claimed in claim 18, wherein said result accumulator comprises:

a first register storing codes of actual amplitude values of harmonic oscillations and having first, second and third inputs and an output, said inputs being respectively connected to said fourth, second and first inputs of said result accumulator;

an arithmetic logical unit, for non-linear conversion of codes of said harmonic oscillators, having first, second and third inputs and an output, said output of said first register being connected to said first input of said arithmetic logical unit;

a second register storing intermediate results of non-linear conversion and having first, second and third inputs and an output, said output of said arithmetic logical unit being connected to said first input of said second register, said second input of said second register being connected to said fifth input of said result accumulator, said third input of said second register being connected to said third input of said result accumulator, and said output of said second register being connected to said second input of said arithmetic logical unit and to said output of said result accumulator;

a first flip-flop storing a polarity sign code of harmonic oscillations and having first and second inputs and an output, said first and second inputs of said first flip-flop being respectively connected to said first and fourth inputs of said result accumulator;

a second flip-flop storing the sign code of the factor by which the harmonic oscillation amplitude is multiplied and having first and second inputs and an output, said first and second inputs of said second flip-flop being respectively connected to said first and sixth inputs of said result accumulator;

a modulo two adding circuit forming an attribute of an operation performed by the arithmetic logical unit having first and second inputs and an output, said first and second inputs of said modulo two adding circuit being connected to said outputs of said first and second flip-flops, respectively, said output of said modulo two adding circuit being connected to said third input of said arithmetic logical unit; and a third register storing the code of the factor by which the harmonic oscillation amplitude is multiplied and having first and second inputs and a group of outputs, said first and second inputs being respectively connected to said first and sixth inputs of said result accumulator, and outputs of said group of outputs of said third register being connected to respective outputs of said group of outputs of said result accumulator.

20. A system as claimed in claim 19, wherein said synchronization unit comprises:

a first flip-flop having an input and first and second outputs;

a second flip-flop having a first input connected to said first output of said flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

21. A system as claimed in claim 18, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

22. A system as claimed in claim 9, wherein said result accumulator comprises:

a first register storing codes of actual amplitude values of harmonic oscillations and having first, second and third inputs and an output, said inputs being respectively connected to said fourth, second and first inputs of said result accumulator;

an arithmetic logical unit, for non-linear conversion of codes of said harmonic oscillators, having first, second and third inputs and an output, said output of said first register being connected to said first input of said arithmetic logical unit;

a second register storing intermediate results of non-linear conversion and having first, second and third inputs and an output, said output of said arithmetic logical unit being connected to said first input of said second register, said second input of said second register being connected to said fifth input of said result accumulator, said third input of said second register being connected to said third input of said result accumulator, and said output of said second register being connected to said second input of said arithmetic logical unit and to said output of said result accumulator;

a first flip-flop storing a polarity sign code of harmonic oscillations and having first and second inputs and an output, said first and second inputs of said first flip-flop being respectively connected to said first and fourth inputs of said result accumulator;

a second flip-flop storing the sign code of the factor by which the harmonic oscillation amplitude is multiplied and having first and second inputs and an output, said first and second inputs of said second flip-flop being respectively connected to said first and sixth inputs of said result accumulator;

a modulo two adding circuit forming an attribute of an operation performed by the arithmetic logical unit having first and second inputs and an output, said first and second inputs of said modulo two adding circuit being connected to said outputs of said first and second flip-flops, respectively, said output of said modulo two adding circuit being connected to said third input of said arithmetic logical unit; and a third register storing the code of the factor by which the harmonic oscillation amplitude is multiplied and having first and second inputs and a group of outputs, said first and second inputs being respectively connected to said first and sixth inputs of said result accumulator, and outputs of said group of outputs of said third register being connected to respective outputs of said group of outputs of said result accumulator.

23. A system as claimed in claim 22, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

24. A system as claimed in claim 9, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

25. A system as claimed in claim 8, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

26. A system as claimed in claim 8, wherein said first distributor comprises:
- a shift register producing a system of potentials to control the frequencies of said harmonic oscillators and having first and second inputs and a group of outputs, outputs of said group of outputs being connected to a respective output of said first group of outputs of said first distributor;
- a flip-flop having a first input, a first output connected to said second output of said first distributor, and a second output connected to second input of said shift register;
- a first conjunctor having a first input connected to said second output of said flip-flop, second and third inputs respectively connected to said first and third inputs of said first distributor, and an output;
- a second conjunctor having a first input connected to said first output of said flip-flop, a second input connected to said second input of said first distributor, and an output connected to said first output of said first distributor and to said first input of said shift register;
- a third conjunctor having a first input connected to said output of said second conjunctor, a second input connected to one of said outputs of said group of outputs of said shift register, and an output connected to said fourth output of said first distributor;
- a disjunctor having first and second inputs respectively connected to said outputs of said third and first conjunctors, and an output connected to said input of said flip-flop;
- a pulse counter producing a code setting the number of a harmonic oscillator and having a first input connected to said output of said second conjunctor, a second input connected to said second output of said flip-flop, and an output connected to said third output of said first distributor; and
- a decoder producing signals to control said harmonic oscillator and having an input connected to said output of said pulse counter, and a group of outputs, outputs of said group of outputs being connected to respective outputs of said second group of outputs of said first distributor.

27. A system as claimed in claim 26, wherein said second distributor comprises:
- a pulse counter having first and second inputs and an output, said first input being connected to said fifth input of said second distributor;
- a first conjunctor having first, second and third inputs and an output, said second input being connected to said fifth input of said second distributor;
- a decoder forming signals for writing information in the initial conditions registers and having first and second inputs and a group of outputs, said first input being connected to said output of said first conjunctor, said second input being connected to said output of said pulse counter, outputs of said group of outputs being connected to respective outputs of said group of outputs of said second distributor;
- a register storing a code, which determines the duration of the pulse of the random pulse process at said output of said digital controlled random actions simulator, and having first and second inputs and an output, said first and second inputs being connected to said second and fourth inputs of said second distributor, respectively;
- a comparison circuit, to record the instant of time corresponding to the end of the pulse of the random pulse process at said output of said digital controlled random actions simulator, having first and second inputs and an output, said first input being connected to said output of said register, and said second input being connected to said output of said pulse counter;
- a first flip-flop having first and second inputs and an output, said output of said flip-flop being connected to said first input of said first conjunctor, said first input of said flip-flop being connected to said second input of said second distributor, said second input of said flip-flop being connected to said third input of said second distributor;
- a second flip-flop having an input and first and second outputs, said second output being connected to said second output of said second distributor, to said second input of said pulse counter, and to said third input of said first conjunctor;
- a second conjunctor having a first input connected to said first input of said second distributor, a second input connected to said first output of said second flip-flop, and an output connected to said first output of said second distributor;
- a third conjunctor having a first input connected to said output of said comparison circuit, a second input connected to said fifth input of said second distributor, and an output connected to said third output of said second distributor; and
- a disjunctor having first and second inputs respectively connected to said outputs of said second and third conjunctors, and an output connected to said input of said second flip-flop.

28. A system as claimed in claim 27, wherein said result accumulator comprises:
- a first register storing codes of actual amplitude values of harmonic oscillations and having first, second and third inputs and an output, said inputs being respectively connected to said fourth, second and first inputs of said result accumulator;
- an arithmetic logical unit, for non-linear conversion of codes of said harmonic oscillators, having first, second and third inputs and an output, said output of said first register being connected to said first input of said arithmetic logical unit;
- a second register storing intermediate results of non-linear conversion and having first, second and third inputs and an output, said output of said arithmetic logical unit being connected to said first input of said second register, said second input of said second register being connected to said fifth input of said result accumulator, said third input of said second register being connected to said third input of said result accumulator, and said output of said second register being connected to said second input of said arithmetic logical unit and to said output of said result accumulator;

a first flip-flop storing a polarity sign code of harmonic oscillations and having first and second inputs and an output, said first and second inputs of said first flip-flop being respectively connected to said first and fourth inputs of said result accumulator;

a second flip-flop storing the sign code of the factor by which the harmonic oscillation amplitude is multiplied and having first and second inputs and an output, said first and second inputs of said second flip-flop being respectively connected to said first and sixth inputs of said result accumulator;

a modulo two adding circuit forming an attribute of an operation performed by the arithmetic logical unit having first and second inputs and an output, said first and second inputs of said modulo two adding circuit being connected to said outputs of said first and second flip-flops, respectively, said output of said modulo two adding circuit being connected to said third input of said arithmetic logical unit; and a third register storing the code of the factor by which the harmonic oscillation amplitude is multiplied and having first and second inputs and a group of outputs, said first and second inputs being respectively connected to said first and sixth inputs of said result accumulator, and outputs of said group of outputs of said third register being connected to respective outputs of said group of outputs of said result accumulator.

29. A system as claimed in claim 28, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

30. A system as claimed in claim 27, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

31. A system as claimed in claim 26, wherein said result accumulator comprises:

a first register storing codes of actual amplitude values of harmonic oscillations and having first, second and third inputs and an output, said inputs being respectively connected to said fourth, second and first inputs of said result accumulator;

an arithmetic logical unit, for non-linear conversion of codes of said harmonic oscillators, having first, second and third inputs and an output, said output of said first register being connected to said first input of said arithmetic logical unit;

a second register storing intermediate results of non-linear conversion and having first, second and third inputs and an output, said output of said first arithmetic logical unit being connected to said first input of said second register, said second input of said second register being connected to said fifth input of said result accumulator, said third input of said second register being connected to said third input of said result accumulator, and said output of said second register being connected to said second input of said arithmetic logical unit and to said output of said result accumulator;

a first flip-flop storing a polarity sign code of harmonic oscillations and having first and second inputs and an output, said first and second inputs of said first flip-flop being respectively connected to said first and fourth inputs of said result accumulator;

a second flip-flop storing the sign code of the factor by which the harmonic oscillation amplitude is multiplied and having first and second inputs and an output, said first and second inputs of said second flip-flop being respectively connected to said first and sixth inputs of said result accumulator;

a modulo two adding circuit forming an attribute of an operation performing by the arithmetic logical unit having first and second inputs and an output, said first and second inputs of said modulo two adding circuit being connected to said outputs of said first and second flip-flops, respectively, said output of said modulo two adding circuit being connected to said third input of said arithmetic logical unit; and a third register storing the code of the factor by which the harmonic oscillation amplitude is multiplied and having first and second inputs and a group of outputs, said first and second inputs being respectively connected to said first and sixth inputs of said result accumulator, and outputs of said group of outputs of said third register being connected to respective outputs of said group of outputs of said result accumulator.

32. A system as claimed in claim 31, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

33. A system as claimed in claim 26, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

34. A system as claimed in claim 8, wherein said second distributor comprises:

a pulse counter having first and second inputs and an output, said first input being connected to said fifth input of said second distributor;

a first conjunctor having first, second and third inputs and an output, said second input being connected to said fifth input of said second distributor;

a decoder forming signals for writing information in the initial conditions registers and having first and second inputs and a group of outputs, said first input being connected to said output of said first conjunctor, said second input being connected to said output of said pulse counter, outputs of said group of outputs being connected to respective outputs of said group of outputs of said second distributor;

a register storing a code, which determines the duration of the pulse of the random pulse process at said output of said digital controlled random actions simulator, and having first and second inputs and an output, said first and second inputs being connected to said second and fourth inputs of said second distributor, respectively;

a comparison circuit, to record the instant of time corresponding to the end of the pulse of the random pulse process at said output of said digital controlled random actions simulator, having first and second inputs and an output, said first input being connected to said output of said register, and said second input being connected to said output of said pulse counter;

a first flip-flop having first and second inputs and an output, said output of said flip-flop being connected to said first input of said first conjunctor, said first input of said flip-flop being connected to said second input of said second distributor, said second input of said flip-flop being connected to said third input of said second distributor;

a second flip-flop having an input and first and second outputs, said second output being connected to said second output of said second distributor, to said second input of said pulse counter, and to said third input of said first conjunctor;

a second conjunctor having a first input connected to said first input of said second distributor, a second input connected to said first output of said second flip-flop, and an output connected to said first output of said second distributor;

a third conjunctor having a first input connected to said output of said comparison circuit, a second input connected to said fifth input of said second distributor, and an output connected to said third output of said second distributor; and a disjunctor having first and second inputs respectively connected to said outputs of said second and third conjunctors, and an output connected to said input of said second flip-flop.

35. A system as claimed in claim 34, wherein said result accumulator comprises:

a first register storing codes of actual amplitude values of harmonic oscillations and having first, second and third inputs and an output, said inputs being respectively connected to said fourth, second and first inputs of said result accumulator;

an arithmetic logical unit, for non-linear conversion of codes of said harmonic oscillators, having first, second and third inputs and an output, said output of said first register being connected to said first input of said arithmetic logical unit;

a second register storing intermediate results of non-linear conversion and having first, second and third inputs and an output, said output of said arithmetic logical unit being connected to said first input of said second register, said second input of said second register being connected to said fifth input of said result accumulator, said third input of said second register being connected to said third input of said result accumulator, and said output of said second register being connected to said second input of said arithmetic logical unit and to said output of said result accumulator;

a first flip-flop storing a polarity sign code of harmonic oscillations and having first and second inputs and an output, said first and second inputs of said first flip-flop being respectively connected to said first and fourth inputs of said result accumulator;

a second flip-flop storing the sign code of the factor by which the harmonic oscillation amplitude is multiplied and having first and second inputs and an output, said first and second inputs of said second flip-flop being respectively connected to said first and sixth inputs of said result accumulator;

a modulo two adding circuit forming an attribute of an operation performed by the arithmetic logical unit having first and second inputs and an output, said first and second inputs of said modulo two adding circuit being connected to said outputs of said first and second flip-flops, respectively, said output of said modulo two adding circuit being connected to said third input of said arithmetic logical unit; and a third register storing the code of the factor by which the harmonic oscillation amplitude is multiplied and having first and second inputs and a group of outputs, said first and second inputs being respectively connected to said first and sixth inputs of said result accumulator, and outputs of said group of outputs of said third register being connected to respective outputs of said group of outputs of said result accumulator.

36. A system as claimed in claim 35, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

37. A system as claimed in claim 34, wherein said synchronization unit comprises:
- a first flip-flop having an input and first and second outputs;
- a second flip-flop having a first input connected to said first output of said first flip-flop, a second input, and first and second outputs;
- a first conjunctor forming a first non-overlapping pulse train and having a first input connected to said first output of said second flip-flop, a second input, a third input, and an output connected to said third output of said synchronization unit;
- a second conjunctor forming a second non-overlapping pulse train and having a first input connected to said second output of said second flip-flop, a second input, and an output connected to said second output of said synchronization unit;
- a first disjunctor having a first input connected to said second output of said first flip-flop, a second input connected to said output of said second conjunctor, third and fourth inputs, and an output connected to said input of said first flip-flop;
- a shift register producing a sequence of control potentials and having a first input connected to said output of said second conjunctor, a second input connected to said first output of said first flip-flop, and a group of outputs, a first output of said group of outputs being connected to said third input of said first disjunctor;
- a third conjunctor forming signals to control said result accumulator and having a first input connected to said output of said second conjunctor, a second input connected to said first output of said shift register, and an output connected to said fourth output of said synchronization unit;
- a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;
- a fourth conjunctor having a first input connected to said first output of said first flip-flop, a second input connected to said second input of said synchronization unit, and an output connected to said second inputs of said first and second conjunctors and of said second flip-flop;
- a fifth conjunctor having a first input connected to said second output of said first flip-flop, second and third inputs, and an output connected to said fourth input of said first disjunctor;
- a sixth conjunctor having first and third inputs respectively connected to said second and first inputs of said synchronization unit, a second input connected to said second output of said first flip-flop, and an output connected to said second input of said fifth conjunctor;
- a seventh conjunctor having a first input connected to said output of said sixth conjunctor, a second input, a third input connected to said second output of said first flip-flop, and an output connected to said first output of said synchronization unit; and
- a third flip-flop having a first input connected to said second output of said first flip-flop, a second input connected to said output of said sixth conjunctor, a first output connected to said second input of said seventh conjunctor, and a second output connected to said third input of said fifth conjunctor.

38. A system as claimed in claim 8, wherein said result accumulator comprises:
- a first register storing codes of actual amplitude values of harmonic oscillations and having first, second and third inputs and an output, said inputs being respectively connected to said fourth, second and first inputs of said result accumulator;
- an arithmetic logical unit, for non-linear conversion of codes of said harmonic oscillators, having first, second and third inputs and an output, said output of said first register being connected to said first input of said arithmetic logical unit;
- a second register storing intermediate results of non-linear conversion and having first, second and third inputs and an output, said output of said arithmetic logical unit being connected to said first input of said second register, said second input of said second register being connected to said fifth input of said result accumulator, said third input of said second register being connected to said third input of said result accumulator, and said output of said second register being connected to said second input of said arithmetic logical unit and to said output of said result accumulator;
- a first flip-flop storing a polarity sign code of harmonic oscillations and having first and second inputs and an output, said first and second inputs of said first flip-flop being respectively connected to said first and fourth inputs of said result accumulator;
- a second flip-flop storing the sign code of the factor by which the harmonic oscillation amplitude is multiplied and having first and second inputs and an output, said first and second inputs of said second flip-flop being respectively connected to said first and sixth inputs of said result accumulator;
- a modulo two adding circuit forming an attribute of an operation performed by the arithmetic logical unit having first and second inputs and an output, said first and second inputs of said modulo two adding circuit being connected to said outputs of said first and second flip-flops, respectively, said output of said modulo two adding circuit being connected to said third input of said arithmetic logical unit; and
- a third register storing the code of the factor by which the harmonic oscillation amplitude is multiplied and having first and second inputs and a group of outputs, said first and second inputs being respectively connected to said first and sixth inputs of said result accumulator, and outputs of said group of outputs of said third register being connected to respective outputs of said group of outputs of said result accumulator.

39. A system as claimed in claim 38, wherein said synchronization unit comprises:

a first flip-flop having an input and first and second outputs;

a second flip-flop having a first input connected to said first output of said first flip-flop, a second input, and first and second outputs;

a first conjunctor forming a first non-overlapping pulse train and having a first input connected to said first output of said second flip-flop, a second input, a third input, and an output connected to said third output of said synchronization unit;

a second conjunctor forming a second non-overlapping pulse train and having a first input connected to said second output of said second flip-flop, a second input, and an output connected to said second output of said synchronization unit;

a first disjunctor having a first input connected to said second output of said first flip-flop, a second input connected to said output of said second conjunctor, third and fourth inputs, and an output connected to said input of said first flip-flop;

a shift register producing a sequence of control potentials and having a first input connected to said output of said second conjunctor, a second input connected to said first output of said first flip-flop, and a group of outputs, a first output of said group of outputs being connected to said third input of said first disjunctor;

a third conjunctor forming signals to control said result accumulator and having a first input connected to said output of said second conjunctor, a second input connected to said first output of said shift register, and an output connected to said fourth output of said synchronization unit;

a second disjunctor forming signals to control said result accumulator and having inputs of a first group of inputs connected to respective outputs of said group of outputs of said shift register, inputs of a second group of inputs connected to respective inputs of said group of inputs of said synchronization unit, and an output connected to said third input of said first conjunctor;

a fourth conjunctor having a first input connected to said first output of said first flip-flop, a second input connected to said second input of said synchronization unit, and an output connected to said second inputs of said first and second conjunctors and of said second flip-flop;

a fifth conjunctor having a first input connected to said second output of said first flip-flop, second and third inputs, and an output connected to said fourth input of said first disjunctor;

a sixth conjunctor having first and third inputs respectively connected to said second and first inputs of said synchronization unit, a second input connected to said second output of said first flip-flop, and an output connected to said second input of said fifth conjunctor;

a seventh conjunctor having a first input connected to said output of said sixth conjunctor, a second input, a third input connected to said second output of said first flip-flop, and an output connected to said first output of said synchronization unit; and a third flip-flop having a first input connected to said second output of said first flip-flop, a second input connected to said output of said sixth conjunctor, a first output connected to said second input of said seventh conjunctor, and a second output connected to said third input of said fifth conjunctor.

* * * * *